United States Patent
Karafin et al.

(10) Patent No.: US 12,204,093 B2
(45) Date of Patent: Jan. 21, 2025

(54) SYSTEMS FOR DIRECTING ENERGY WITH ENERGY DIRECTING SURFACE WITH NON-ZERO DEFLECTION ANGLE

(71) Applicant: LIGHT FIELD LAB, INC., San Jose, CA (US)

(72) Inventors: Jonathan Sean Karafin, San Jose, CA (US); Brendan Elwood Bevensee, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 457 days.

(21) Appl. No.: 17/439,371

(22) PCT Filed: Mar. 16, 2020

(86) PCT No.: PCT/US2020/023030
§ 371 (c)(1),
(2) Date: Sep. 14, 2021

(87) PCT Pub. No.: WO2020/186272
PCT Pub. Date: Sep. 17, 2020

(65) Prior Publication Data
US 2022/0155583 A1    May 19, 2022

Related U.S. Application Data

(60) Provisional application No. 62/818,553, filed on Mar. 14, 2019.

(51) Int. Cl.
*G02B 26/08*    (2006.01)
*G02B 1/00*    (2006.01)

(52) U.S. Cl.
CPC ......... *G02B 26/0875* (2013.01); *G02B 1/002* (2013.01)

(58) Field of Classification Search
CPC ............................ G02B 26/0875; G02B 1/002
USPC ......................................................... 359/237
See application file for complete search history.

(56) References Cited

U.S. PATENT DOCUMENTS

| | | |
|---|---|---|
| 7,490,941 B2 | 2/2009 | Mintz et al. |
| 8,149,265 B2 | 4/2012 | Smalley et al. |
| 8,667,519 B2 | 3/2014 | Small et al. |
| 10,432,919 B2 | 10/2019 | Lapstun |
| 10,444,842 B2 | 10/2019 | Long et al. |
| 10,560,689 B2 | 2/2020 | Lapstun |
| 11,451,875 B2 | 9/2022 | Kim |
| 2006/0028400 A1 | 2/2006 | Lapstun et al. |
| 2007/0103782 A1 | 5/2007 | Lee et al. |
| 2008/0068372 A1 | 3/2008 | Krah |
| 2008/0144174 A1 | 6/2008 | Lucente et al. |

(Continued)

FOREIGN PATENT DOCUMENTS

| | | |
|---|---|---|
| GB | 2550137 A | 11/2017 |
| JP | 2006098775 A | 4/2006 |

(Continued)

OTHER PUBLICATIONS

EP-20780014.5 Extended European Search Report of European Patent Office mailed Nov. 30, 2022.

(Continued)

*Primary Examiner* — William Choi

(57) ABSTRACT

Non-zero deflection angle may be effected by implementing the embodiments of the present disclosure to allow for directing projected energy to a desired region, such as a region closer to the energy directing surface.

27 Claims, 23 Drawing Sheets

(56) References Cited

U.S. PATENT DOCUMENTS

| | | |
|---|---|---|
| 2008/0170293 A1 | 7/2008 | Lucente et al. |
| 2009/0040294 A1 | 2/2009 | Smalley et al. |
| 2009/0141022 A1 | 6/2009 | Kimpe |
| 2010/0157399 A1 | 6/2010 | Kroll et al. |
| 2011/0012895 A1 | 1/2011 | Lucente et al. |
| 2011/0211256 A1 | 9/2011 | Connor |
| 2011/0228040 A1 | 9/2011 | Blanche et al. |
| 2012/0313839 A1 | 12/2012 | Smithwick et al. |
| 2013/0069933 A1 | 3/2013 | Smithwick et al. |
| 2013/0176407 A1 | 7/2013 | Curtis et al. |
| 2014/0035959 A1 | 2/2014 | Lapstun |
| 2014/0293385 A1 | 10/2014 | Smithwick |
| 2014/0300694 A1 | 10/2014 | Smalley et al. |
| 2014/0300695 A1 | 10/2014 | Smalley et al. |
| 2014/0347361 A1 | 11/2014 | Alpaslan et al. |
| 2015/0084951 A1 | 3/2015 | Boivin et al. |
| 2015/0201186 A1 | 7/2015 | Smithwick |
| 2015/0277378 A1 | 10/2015 | Smithwick et al. |
| 2015/0317541 A1 | 11/2015 | Grefalda et al. |
| 2016/0070356 A1 | 3/2016 | Aguirre et al. |
| 2016/0139402 A1 | 5/2016 | Lapstun |
| 2016/0170372 A1 | 6/2016 | Smithwick |
| 2016/0274539 A1 | 9/2016 | Smithwick |
| 2016/0282808 A1 | 9/2016 | Smalley |
| 2016/0373701 A1 | 12/2016 | Ferri et al. |
| 2017/0045652 A1 | 2/2017 | Arbabi et al. |
| 2017/0131460 A1 | 5/2017 | Lin et al. |
| 2017/0214907 A1 | 7/2017 | Lapstun |
| 2017/0223344 A1 | 8/2017 | Kaehler |
| 2017/0289530 A1 | 10/2017 | Smithwick et al. |
| 2018/0063519 A1 | 3/2018 | Smithwick et al. |
| 2018/0084245 A1 | 3/2018 | Lapstun |
| 2018/0151035 A1 | 5/2018 | Maalouf et al. |
| 2018/0292644 A1 | 10/2018 | Kamali et al. |
| 2018/0307182 A1 | 10/2018 | Chen |
| 2018/0356591 A1 | 12/2018 | Karafin et al. |
| 2018/0372926 A1 | 12/2018 | Karafin et al. |
| 2019/0011621 A1 | 1/2019 | Karafin et al. |
| 2019/0041797 A1 | 2/2019 | Christmas et al. |
| 2019/0043447 A1 | 2/2019 | Chung et al. |
| 2019/0121432 A1 | 4/2019 | Krogstad et al. |
| 2019/0197789 A1 | 6/2019 | Macauley et al. |
| 2019/0259320 A1 | 8/2019 | Lapstun |
| 2020/0228790 A1 | 7/2020 | Rakshit et al. |
| 2020/0310115 A1 | 10/2020 | Fattal |
| 2021/0200150 A1 | 7/2021 | Fattal |

FOREIGN PATENT DOCUMENTS

| | | |
|---|---|---|
| JP | 2008113288 A | 5/2008 |
| JP | 2009530661 A | 8/2009 |
| WO | 2008048360 A2 | 4/2008 |
| WO | 2017127897 A1 | 8/2017 |
| WO | 2018014009 A1 | 1/2018 |
| WO | 2018014010 A1 | 1/2018 |
| WO | 2018014036 A1 | 1/2018 |
| WO | 2018014044 A1 | 1/2018 |
| WO | 2018014045 A3 | 3/2018 |
| WO | 2018200417 A1 | 11/2018 |
| WO | 2019140414 A1 | 7/2019 |

OTHER PUBLICATIONS

International Search Report and Written Opinion of PCT/US2020/021998 dated Jul. 23, 2020.

International Search Report and Written Opinion of PCT/US2020/023030 dated Jul. 1, 2020.

Zhao et al., "A continuously tunable acoustic metasurface for transmitted wavefront manipulation" ARXIV Preprint; Nov. 27, 2017; Retrieved From online [Retrieved May 24, 2020] entire document.

JP2021-554618 Non-Final Notice of Reasons for Rejection of the Japan Patent Office dated Aug. 8, 2023.

EP-20769300.3 European Partial Search Report of European Patent Office dated Nov. 11, 2022.

EP-20769300.3 Extended European Search Report of European Patent Office mailed Feb. 14, 2023.

JP2021-556750 Non-Final Notice of Reasons for Rejection from the Japan Patent Office mailed Feb. 20, 2024.

KR-10-2021-7031897 Notice of Preliminary Rejection of Korean Patent Office dated Jun. 24, 2024.

SYSTEMS FOR DIRECTING ENERGY WITH ENERGY DIRECTING SURFACE WITH NON-ZERO DEFLECTION ANGLE

BACKGROUND

An energy directing device may include an energy projection surface, comprising a plurality of locations, where at each location energy is projected in multiple directions. In general, the energy directed from a single energy surface location may be comprised of many separate energy projection paths (or energy rays) grouped in a solid angle around a single energy propagation axis, or center energy projection path. This energy propagation axis is a line of symmetry since it lies approximately in the midpoint of all the energy projection paths leaving a single energy surface location in both the horizontal and vertical dimensions. It is often substantially aligned with the average energy vector for all the energy rays leaving a single energy surface location.

BRIEF SUMMARY

In an embodiment, an energy directing system comprises an energy surface comprising a plurality of energy source locations and an array of energy waveguides. Each waveguide may be configured to direct energy along different propagation paths from different energy locations of the energy surfaces, wherein each propagation path has a four-dimensional coordinate, the four-dimensional coordinate comprising two spatial coordinates corresponding to a location of the respective energy waveguide and two angular coordinates determined at least in part by the energy source location relative to the respective waveguide, the angular coordinates defining the direction of the respective propagation path. The propagation paths of each waveguide are grouped around an energy propagation axis that defines an axis of symmetry with respect to an angular range of the propagation paths of the respective waveguide. The array of energy waveguides define an energy directing surface and comprise a first waveguide having a first energy propagation axis and a second waveguide having a second energy propagation axis, the first and second energy propagation axes form first and second deflection angles, respectively, relative to a normal of the energy directing surface, and further wherein the first and second deflection angles are different.

In an embodiment, an energy directing system may comprise an energy surface comprising a plurality of energy source locations and an array of energy waveguides. Each waveguide configured to direct energy along different propagation paths from different energy locations of the energy surfaces, wherein each propagation path has a four-dimensional coordinate, the four-dimensional coordinate comprising two spatial coordinates corresponding to a location of the respective energy waveguide and two angular coordinates determined at least in part by the energy source location relative to the respective waveguide, the angular coordinates defining the direction of the respective propagation path. The energy directing system may further include an optical element disposed in the propagation paths of at least a first energy waveguide of the array of energy waveguides, the optical element configured to receive energy along the plurality of propagation paths of the first energy waveguide and redirect energy along a plurality of deflected propagation paths, the plurality of deflected propagation paths and the plurality of propagation paths of the first energy waveguides forming non-zero deflection angles therebetween. In an embodiment, the energy directing system may be configured such that a central propagation path maps to a deflected propagation path substantially aligned with along an axis of symmetry for the plurality of deflected propagation paths. In an embodiment, the energy directing system may be configured such that the non-zero deflection angle of the plurality of deflected propagation paths form a gradient of deflection angles.

In an embodiment, a mechanical energy directing system may comprise an array of mechanical energy sources located in a plurality of energy source locations and a deflection element comprising a plurality of deflection locations, wherein each deflection location is configured to receive mechanical energy from at least one of the plurality of energy source locations and deflect the received mechanical energy along corresponding one or more deflected propagation paths. Each deflected propagation path has a four-dimensional coordinate in a four-dimensional coordinate system, the four-dimensional coordinate comprising two spatial coordinates corresponding to the position of the respective deflection location in the deflection element, and two angular coordinates defining the angular direction of the respective deflected propagation path.

In an embodiment, a multi energy directing system may comprise a multi-energy surface comprising: a plurality of electromagnetic energy source locations; and a plurality of mechanical energy source locations. The multi energy directing system may further include a multi-energy directing surface comprising: 1) an array of energy waveguides, each waveguide configured to direct electromagnetic energy along different propagation paths through different electromagnetic energy source locations, wherein each propagation path has a four-dimensional coordinate in a four-dimensional coordinate system, the corresponding four-dimensional coordinate comprising two spatial coordinates corresponding to a location of the respective energy waveguide and two angular coordinates determined at least in part by the electromagnetic energy source location relative to the respective waveguide, the angular coordinates defining the direction of the respective propagation path; and 2) a plurality of deflection locations interleaved with the array of energy waveguides, wherein each deflection location is configured to receive mechanical energy from at least one of the plurality of mechanical energy source locations and deflect the received mechanical energy along corresponding deflected propagation paths, wherein each deflected propagation path has a corresponding four-dimensional coordinate in the four-dimensional coordinate system, the four-dimensional coordinate of each deflected propagation path comprising two spatial coordinates corresponding to the position of the respective deflection location, and two angular coordinates defining the angular direction of the respective deflected propagation path.

DETAILED DESCRIPTION

Under many circumstances, the center energy propagation path, or energy propagation axis, is normal to the energy projection surface of an energy directing device. Under these circumstances, the groups of energy rays from each location on the energy surface are distributed in a solid angle around an axis which is normal to the energy directing surface, independent of location on the energy surface. In other words, at each location on the energy surface, the energy propagation axis is aligned with the normal to the display surface. We introduce the energy deflection angle, or simply deflection angle, as the angle that the energy propagation axis makes with the normal to the display surface. In general, the deflection angle gives the direction of energy flow from the energy surface. It describes the average deflection of a plurality of projection paths at a particular location on that energy surface, relative to a normal to that surface.

For some embodiments of an energy directing device, it may be advantageous to have the direction of energy propagation, or energy propagation axis, no longer be aligned with the normal to the display surface at some locations on the energy surface. In other words, for some locations on the energy directing surface, there is a nonzero deflection angle. In some embodiments, the deflection angle may change with position across the energy projecting surface of the energy directing device. This may be done to focus the projected energy rays to a more localized region. It may also allow the convergence locations for all the energy rays to be closer to the energy directing surface, if the groups of energy propagation paths corresponding to locations near the edges of the energy directing surface are tilted toward the center of the energy directing surface.

Many example diagrams in this disclosure demonstrate this principle by illustrating embodiments where light rays are projected by a holographic energy surface, such as a light field display surface. Each location on a holographic energy surface has a two-dimensional (2D) spatial coordinate, and projects a group of light rays at a plurality of angles. Each light ray is associated with a 2D angular coordinate, and together the 2D spatial coordinate and the 2D angular coordinates form a 4D coordinate for each energy projection path. In each example, it is possible to generalize the discussion to include energies of other types, such as mechanical energy, in which transducers create energy at an energy projecting surface which may be able to project ultrasound waves in multiple directions depending on the location on the energy projecting surface, or even multiple directions at each location on the energy projecting surface. These ultrasound waves may converge to form tactile surfaces in front of the energy surface.

Figure 1A:
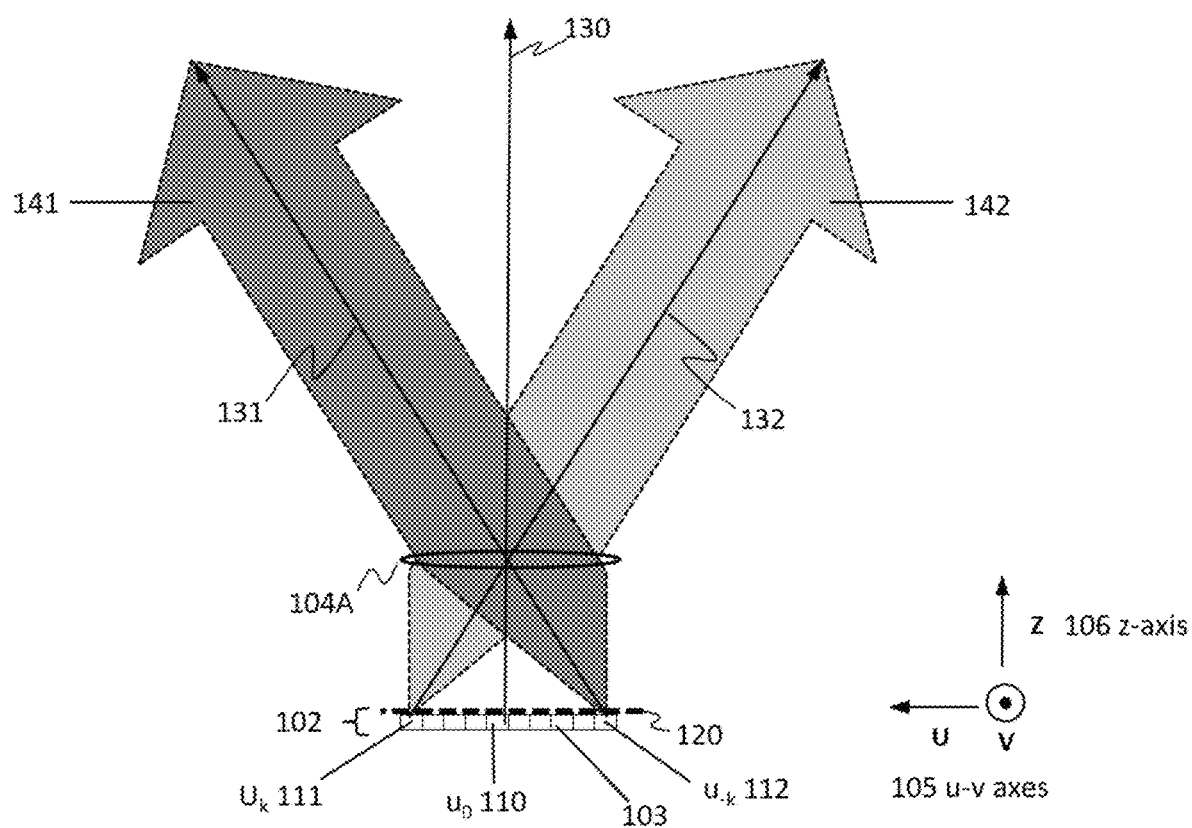
FIG. 1A illustrates an embodiment of an energy directing system in a four-dimensional coordinate system, in accordance with the present disclosure.

An energy surface may be combined with arrays of waveguides in order to create an energy directing system. FIG. 1A shows an example wherein a single waveguide 104A is placed over an energy source plane 120 defined by a plurality of individually-addressable energy source locations, such as locations 110, 111, and 112 at coordinates $u_0$, $u_k$, and $u_{-k}$, respectively. In an embodiment, the energy source locations are defined on a seamless energy surface 102. In an embodiment, the energy surface 102 may be the surface of a display panel or a surface of a relay medium. As such, in an embodiment, the energy source locations may be individual pixels of a display panel. In another embodiment, the energy source locations correspond to energy locations on a relayed energy surface.

In an embodiment, the waveguide 104A is configured to propagate energy to and/or from an energy source location, such as location 103, on the energy surface 102, along an angle determined at least in part by the location of the energy source location 103 with respect to the waveguide 104A. For example, some of the energy from the energy source location at $u_k$ 111 is received by the waveguide 104A and propagated into a propagation path 142 defined by a chief ray propagation path 132, corresponding to the location of energy source location $u_k$ 111 relative to waveguide 104A. Similarly, the energy to and/or from the pixel at $u_{-k}$ 112 is received by the waveguide 104A and directed along a propagation path 141, which is defined by chief ray propagation path 131, corresponding to the location of energy source location $u_{-k}$ 112 relative to waveguide 104A. The chief ray 130 that is normal to the energy surface 102 is provided in this example by the energy source location $u_0$ 110 close to an axis of symmetry for the propagation paths of the waveguide 104A, which is substantially aligned with energy propagation path 130. The coordinates $u_0$, $u_k$, and $u_{-k}$ are angular coordinates of energy propagation paths in one dimension, axis U, but there is a corresponding angular coordinate in the orthogonal dimension, axis V. In a four-dimensional coordinate system, the waveguide 104A may be assigned to have a single spatial coordinate in two dimensions (X,Y), and an energy source location associated with a waveguide may produce an energy propagation path with a two-dimensional angular coordinate (U, V). Together, these 2D spatial coordinates (X,Y) and 2D angular coordinates (U,V) form a 4-dimensional (4D) energy propagation path coordinate (X,Y,U,V) assigned to each energy source location 103 located in the energy source plane 120.

Figure 1B:
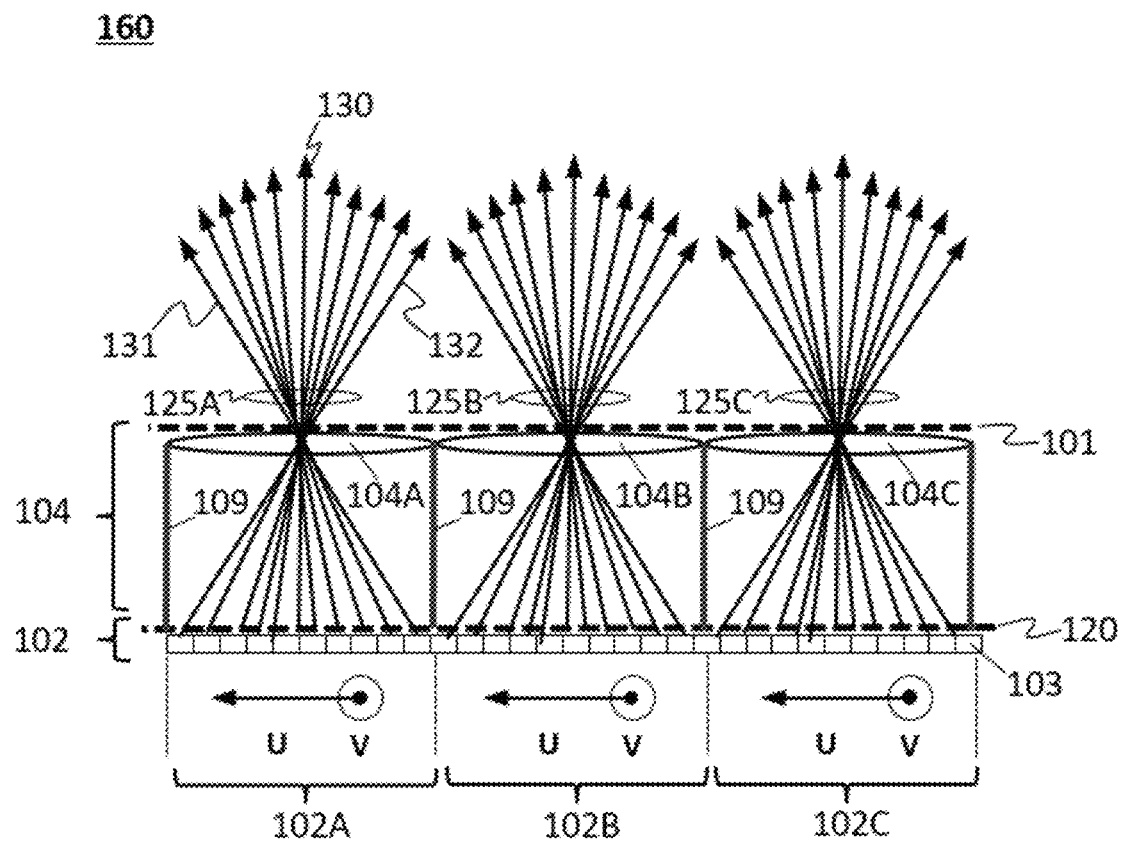
FIG. 1B illustrates an embodiment of an energy directing in the four-dimensional coordinate system illustrated in FIG. 1A, in accordance with the present disclosure.

As an example, in an embodiment, a four-dimensional light field may be defined by all the 4D coordinates (X,Y,U,V) for multiple waveguides at various spatial coordinates, each waveguide 104A associated with multiple illumination source pixels 103, each pixel with independent U, V coordinates. FIG. 1B shows a holographic electromagnetic energy directing system 160 comprised of a waveguide array disposed over an illumination source plane 120 defined by an energy surface 102. Above the energy surface 102, the holographic system 160 may include a waveguide array 104 comprised of waveguides 104A, 104B, and 104C. Associated with each waveguide 104A, 104B, and 104C is a group of pixels 102A, 102B, and 102C, which projects and/or receives electromagnetic energy along propagation paths 125A, 125B, and 125C, respectively. The array of waveguides 104 defines an energy directing surface 101. The chief rays 131, 130, and 132 define a range of energy propagation paths directed through the waveguide 104A at the minimum value, mid-value, and maximum value of light field angular coordinate U, respectively. Since the energy source locations of the energy surface 102 extend in two dimensions, there are a plurality of energy propagation paths through the waveguide 104A in the light field angular coordinate V which is orthogonal to U, although these are not shown in FIG. 1B. In other words, there is a bundle of light rays (energy propagation paths) that are projected from all the energy source locations associated with a waveguide 104A, and these are substantially grouped around the center axis 130. This center energy propagation axis, or energy propagation axis defines a line of symmetry, since it is often coincident with the approximate midpoint of the angular range of light rays projected from the energy directing system 160 at a particular (X,Y) location for waveguide 104A, both in the horizontal and vertical dimensions. In FIG. 1B, in an embodiment, the energy-inhibiting structures 109 may be configured to form vertical walls between neighboring waveguides 104A, 104B, and 104C to inhibit the energy from one group of energy sources associated with a first waveguide from reaching the neighboring waveguide. For example, electromagnetic energy of any pixel 102B associated with the center waveguide 104B cannot reach waveguide 104A because the energy-inhibiting structure 109 between these two waveguides may absorb this energy.

Figures 1C, 1D:
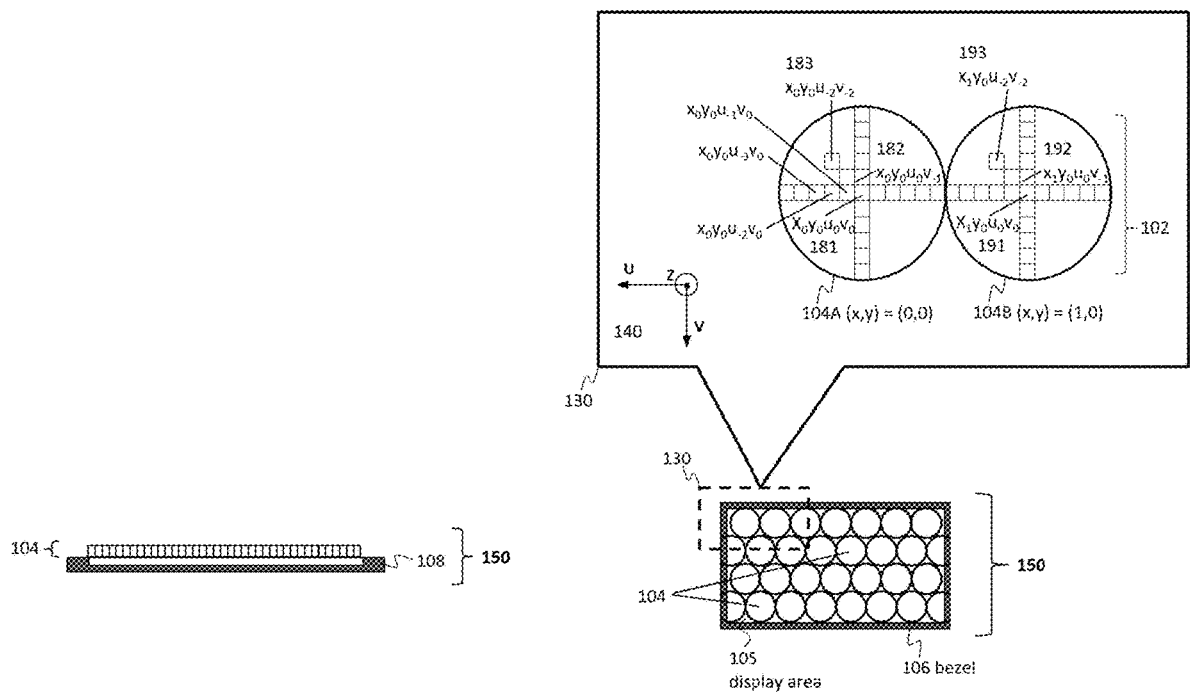
FIG. 1C illustrates a side view of a light field display, in accordance with the present disclosure.
FIG. 1D illustrates an embodiment of an energy device with an active energy area in a four-dimensional coordinate system, in accordance with the present disclosure.

In an example, FIG. 1C shows a side view of a light field display 150 comprised of the display device 108 with a two-dimensional waveguide array 104 shown in FIG. 1B mounted above its active display area surface. This light field display projects light rays into propagation paths as shown in FIG. 1B. In one embodiment, the display 150 may be used as a building block in a light field display assembly with a higher resolution than the individual light field display 150 with the use of tapered energy relays.

FIG. 1D shows an energy device 101A, such as a display, with an active energy area 105 covered with an array of waveguides 104, surrounded by a non-energetic bezel 106. A magnified view of an area 130 shows the two waveguides 104A at (X,Y)=(0,0) and 104B at (X,Y)=(1,0) as defined by the U,V, and Z-axes 140 that are shown in FIG. 1B, as well as the 4-D coordinates for the energy source associated with each waveguide. These energy source locations are located on the energy surface 102 and define the energy source plane 120. For example, energy source location 183 is associated with (X,Y,U,V) coordinates (0,0,−2,−2), denoted by $x_0y_0u_{-2}v_{-2}$. The energy source location 193, under the same relative location relative to waveguide 104B as the location of energy source location 183 relative to waveguide 104A, has the same (U,V) coordinate (−2,−2), with (X,Y,U,V) coordinate (1,0,−2,−2). Similarly, energy source location 181 at the center of waveguide 104A, has (X,Y,U,V) coordinate (0,0,0,0), while energy source location 191 at the center of waveguide 104B has (X,Y,U,V) coordinate (1,0,0,0). Some other 4D energy propagation path coordinates are shown in FIG. 1D, including (X,Y,U,V)=(0,0,−1,0), (0,0,−2,0), (0,0,−3,0), and (1,0,0,0).

Figure 1E:
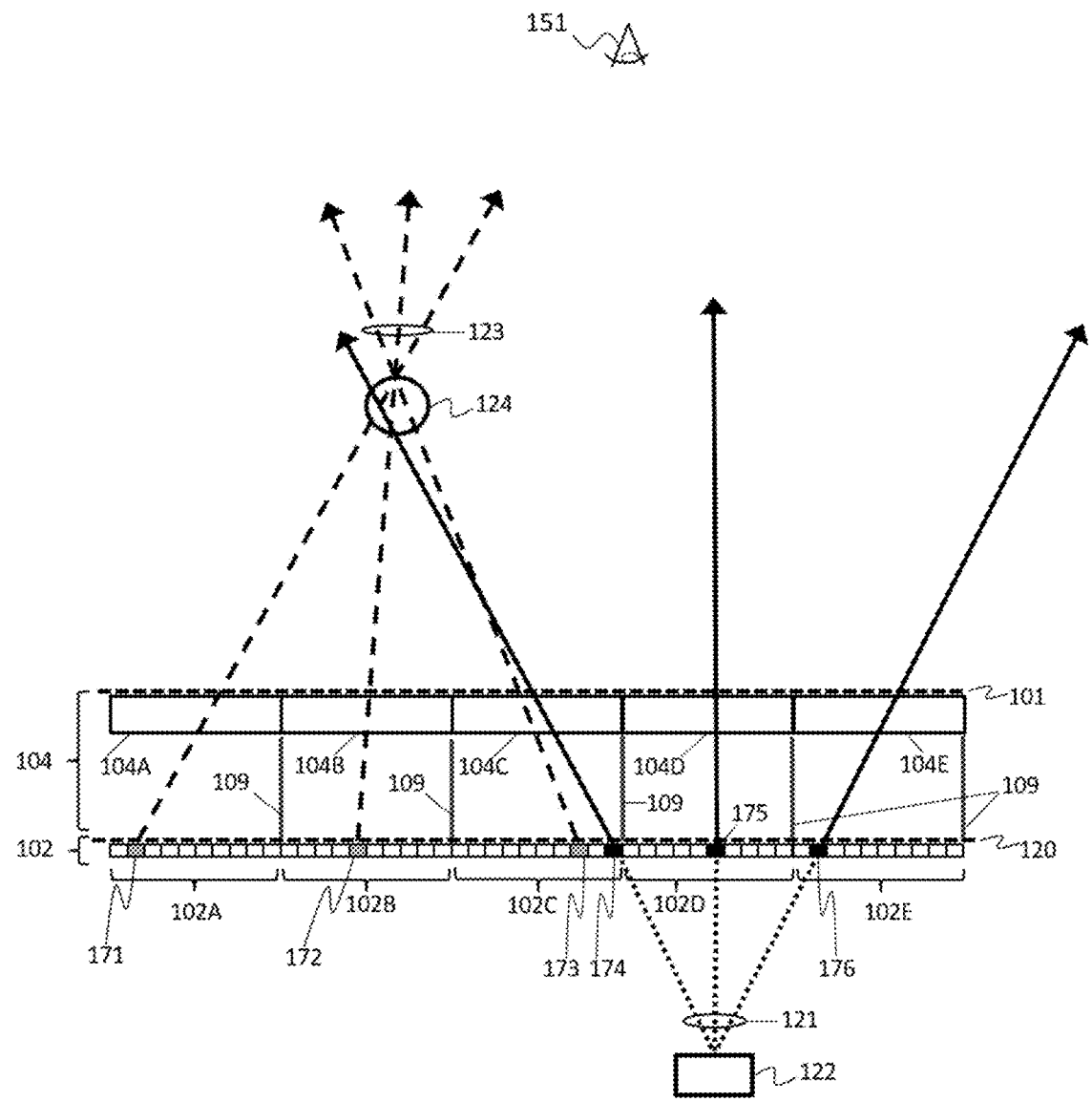
FIG. 1E illustrates the projection of two holographic objects by a light field display, in accordance with the present disclosure.

FIG. 1E shows an example in which two holographic objects 122 and 124 are projected by a light field display system comprised of five waveguides 104A-E that define an energy directing surface 101, wherein each waveguide projects light from a group of associated pixels 102A-E, respectively. The holographic object 122 and 124 are created by the convergence of a multitude of light projection paths such as propagation path groups 121 and 123, and are perceived by an observer 151. The pixel plane 120 is defined by a seamless energy surface 102. The light rays defined by chief rays 123 forming holographic object 124 include light from pixel 171 projected by waveguide 104A, light from pixel 172 projected by waveguide 104B, and light from pixel 173 projected by waveguide 104C. The light rays defined by chief rays 121 converging at the in-screen holographic object 122 include light from pixel 174 projected by waveguide 104C, light from pixel 175 projected by waveguide 104D, and light from pixel 176 projected by waveguide 104E. In FIG. 1E, the light-inhibiting structures 109 forming vertical walls between neighboring waveguides 104A-E prevent light generated by one group of pixels associated with a first waveguide from reaching a neighboring waveguide. For example, light from any pixel 102C associated with the waveguide 104C cannot reach waveguide 104B or waveguide 104D because the light-inhibiting structures 109 surrounding waveguide 104C would block and absorb this stray light. While FIG. 1E illustrates an embodiment of a light field display system for projecting light, it is to be appreciated that the same principles apply for other types of holographic energy systems, such as light field capture system, light field display and capture system, holographic energy system of other electromagnetic energy or mechanical energy, bidirectional energy systems, or multiple energy domains.

Figure 2A:
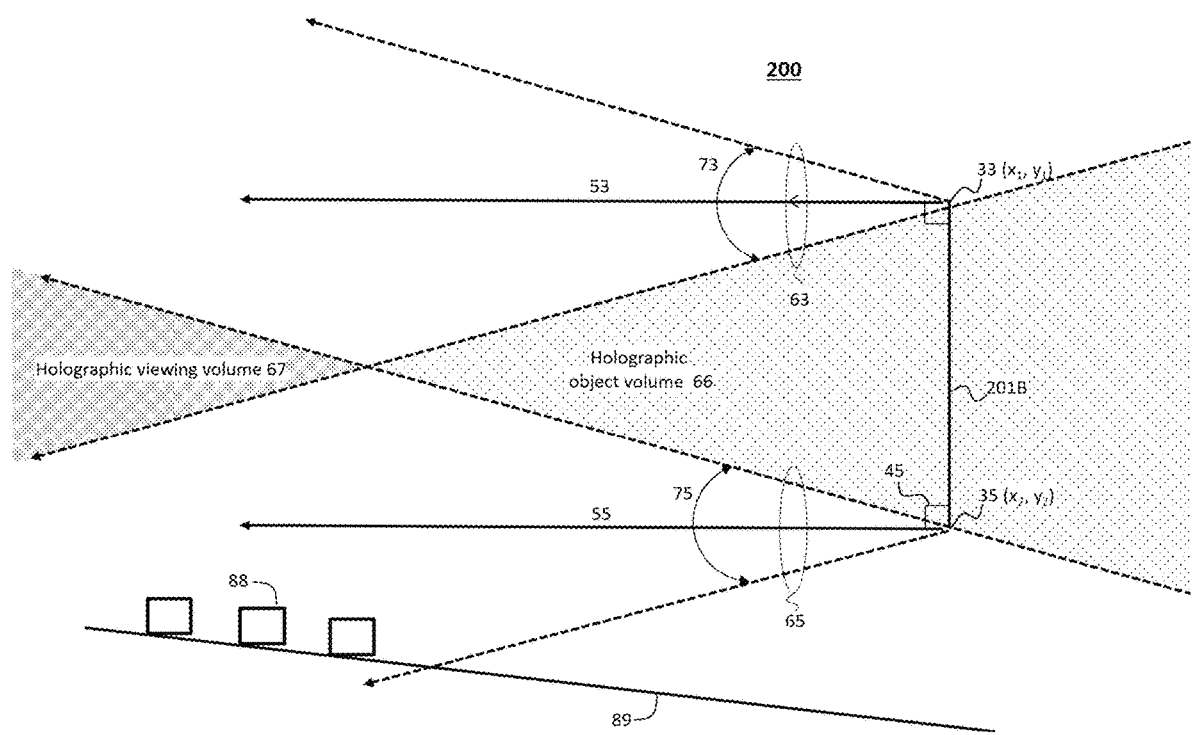
FIG. 2A illustrates a schematic diagram of an embodiment of an energy directing system having zero deflection angle at certain locations, in accordance with the present disclosure.

FIG. 2A illustrates a schematic diagram of an embodiment of an energy directing system 200. In an embodiment, the energy directing system may be wall mounted, projecting electromagnetic and/or mechanical energy such as light or sound waves outward to an audience in seats including seat 88 mounted on a graded floor 89. In an embodiment, the energy directing system 200 may be similar to the energy directing systems discussed above with respect to FIGS. 1A, 1B, and 1E. Specifically, the energy directing system 200 includes an energy directing surface 201A formed by an array of energy waveguides (not shown). The energy directing surface 201A may be configured according to the principles disclosed above with respect to the energy directing surface 101 defined by waveguides 104 as shown in FIGS. 1A-1E, where each waveguide is associated with a group of energy source locations, and configured to direct energy from each of the associated energy source locations along an energy propagation path associated with a four-dimensional (4D) coordinate. This 4D coordinate is comprised of two spatial coordinates corresponding to a location of the waveguide through which the respective energy propagation path passes, and two angular coordinates determined at least by a location of the respective energy source location, the angular coordinates defining the direction of the respective propagation path.

In an embodiment, the holographic energy system 200 is configured to project bundles of light rays, including light ray bundle 63 from the top location 33 ($x_1$, $y_1$) of a light field display surface 201A, and light ray bundle 65 from the bottom location 35 ($x_2$, $y_2$) of the light field display surface 201A. The top location 33 and bottom location 35 are each associated with a spatial coordinate (X, Y), and the plurality of light propagation paths are defined according to the 4D coordinate system discussed above with respect to FIGS. 1A-1E. Each light ray group may be centered on a center light energy propagation axis, or center light ray, which defines the general direction of propagation for the light rays leaving the display surface 201A at a given location (X,Y) on that light field display surface 201A. In the illustrated embodiment in FIG. 1A, light ray group 63 is projected along the center light energy propagation axis 53, and light ray group 65 is projected along center light energy propagation axis 55. Each light energy propagation axis (also called a center energy propagation path) may represent a line of symmetry, since it is often coincident with the approximate midpoint of the angular range of light rays projected from the holographic energy system 200 at a particular (X,Y) location in the 4D coordinate system, both in the horizontal and vertical dimensions. For example, center light propagation axis 53 lies approximately along the midpoint of the angular range 73 for the light rays leaving the top location 33 of the energy directing surface 201A, and center light propagation axis 55 lies close to the midpoint of the angular range 75 for the light ray group 65 projected from the bottom location 35 of the energy directing surface 201A. The center light propagation axis, or center energy projection path, is often substantially aligned with the average energy vector for all the light rays leaving the display surface at a given position.

FIG. 2A illustrates an embodiment of the holographic energy system 200 with zero deflection angle, where the center light energy propagation axis of each group of rays projected from a light field display surface 201A are parallel, and normal to that energy directing surface 201A, as shown by the right angle 45 that the center light energy propagation axis 55 makes with the light field display surface. Note that with this embodiment, no light rays from the group of light rays 63 reach viewer seat 88, which means that a viewer in this seat 88 cannot see light rays from the top location 33 of the light field display surface 201A, and therefore seat 88 is not in the holographic viewing volume 67 of the display. Holographic objects that are formed by converging light propagation paths from the light field display in the holographic object volume 66 may be fully viewable to a viewer within the holographic viewing volume 67. The boundary of the holographic viewing volume in the side view shown in FIG. 2A may be formed by the region in which at least one energy propagation path from a waveguide at an energy location 33 on the top of the display can intersect with at least one energy propagation path of a waveguide at an energy location 35 on the bottom off the display. In FIG. 2A, at each location within the holographic viewing volume 67 of a light field display, at least one light propagation path from most of the waveguides on the light directing display surface can intersect. In general, a holographic viewing volume of the array of waveguides comprises a set of locations where at least one propagation path from each waveguide of the array of waveguides can intersect. A different holographic viewing volume including seat 88 may be effected by introducing a nonzero deflection angle to the group of light rays that are projected from waveguides at selected locations on the energy directing surface 201A. This deflection in the energy propagation axis may be applied with different magnitude and direction at different points on the light field display surface 201A in order to optimize the viewing volume for a given seating arrangement of viewers of the display, and result in a holographic viewing volume 67 which is closer to the light field display surface 201A and thus closer to holographic objects projected from the light field display surface 201A.

Figure 2B:
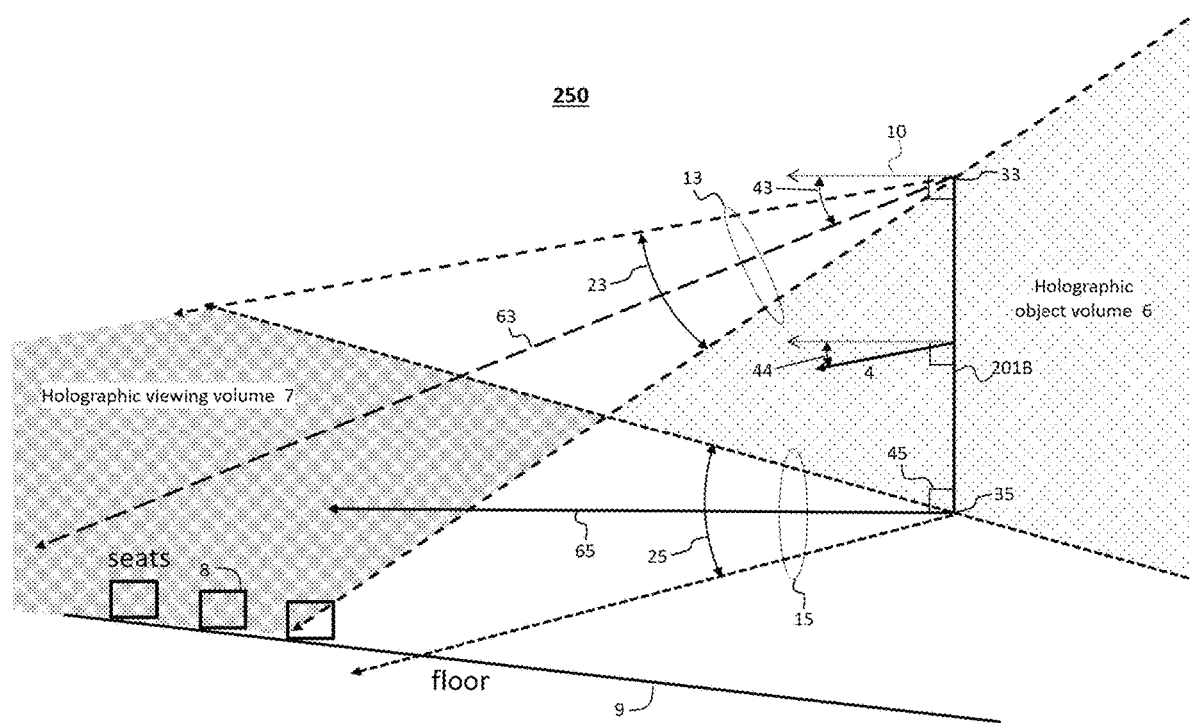
FIG. 2B illustrates a schematic diagram of an embodiment of an energy directing system having non-zero deflection angle at certain locations, in accordance with the present disclosure.

FIG. 2B illustrates an embodiment of the holographic energy system 250, in accordance with the principles disclosed in the present disclosure. The holographic energy system 250 is similar to the holographic energy system 200 illustrated in FIG. 2A with the modification of including at least one non-zero deflection angle in the holographic energy system 250. The same numerals are assigned to the same components in FIGS. 2A and 2B. In an embodiment, the light field display surface 201B may correspond to an alternate configuration of the energy directing surface 101 defined by an array of waveguides similar to waveguides 104 defined above in FIGS. 1A-1E. In an embodiment, the holographic energy system 250 in FIG. 2B is configured to propagate energy to and/or from an audience which resides at a location that is primarily below a portion of the holographic energy system 250, such as its midpoint height.

In an embodiment, this is accomplished by configuring the holographic energy system 250 so the light projection axes for at least some of the projected rays are tilted downward. For example, a light ray bundle 13 projected from the top location 33 of the light field display surface 201B is defined by a light energy propagation axis 63, forming a non-zero deflection angle 43 with a normal 10 to the light field display surface 201B, which, in this embodiment, results in the light energy propagation axis 63 tilting down towards the audience members. In an embodiment, the light rays projected from the bottom location 35 of the light field display surface 201B are defined by a light energy propagation axis 65 with a different direction than axis 63, in this case normal 45 to the light field display surface 201B. The angular spread 23 of the projected rays 13 about axis 63 projected from the top of the display represents a vertical field of view 23, while the angular spread of the group of projected rays 15 about axis 65 projected from the bottom of the display represents a vertical field of view 25, where the angular spread of 23 and 25 may be equal. In an embodiment, the light rays projected at positions located between the top location 33 and bottom location 35 of the light field display surface 201B may have a deflection angle which varies between angle 43 at the top of the light field display surface 201B, and the angle of zero (normal 45 to the display surface) at the bottom of the light field display surface 201B. In an embodiment, this variation may be a gradient, such that the light rays projected from the middle height of the light field display surface 201B and characterized by the light energy propagation axis 4 and are projected with a deflection angle 44, which is a value between the deflection angle 43 at the top location 33 of the light field display surface 201B and the deflection angle of zero (normal 45) at the bottom location 35 of the light field display surface 201B. A possible advantage of this gradient configuration is that the holographic viewing volume 7 for holographic objects projected from light field display surface 201 may be optimized for the anticipated seating arrangement, achieving improved performance and composite field-of-view for that set of viewers given the available angular ranges 23, 25 of projected rays. Note that an added advantage is that the holographic viewing volume 7 is now closer to the light field display surface 201B and the holographic object volume 6 with the nonzero deflection angles shown in FIG. 2B, as compared to the increased separation of the holographic viewing volume 67 from the holographic object volume 66 with zero deflection angle shown in FIG. 2A. In general, the deflection angles of waveguides in an array of waveguides may be configured such that the holographic viewing volume of the array of waveguides is closer to the energy directing surface than the holographic view volume of the array of waveguides if the deflection angles of the waveguides of array of waveguides were configured to be zero.

A deflection angle, whether it is constant or variable across the energy directing surface 201B, may be implemented with configurations of the present disclosure for waveguides at the display surface, or with separate energy-deflecting elements placed close to the energy directing surface 201B.

Figure 3A:
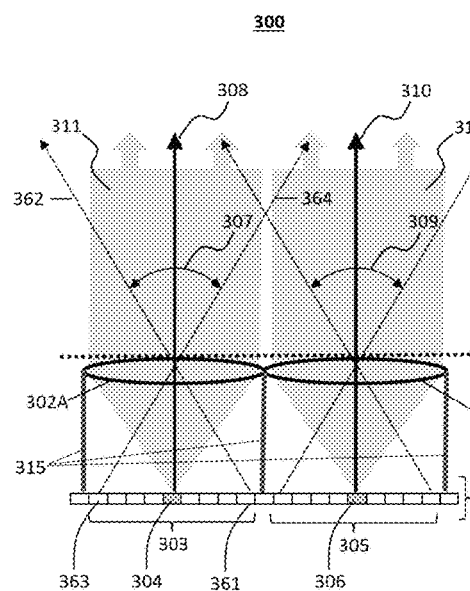
FIG. 3A illustrates an orthogonal view of a subsystem of an energy directing system with zero deflection angle, in accordance with the present disclosure.

FIG. 3A illustrates an orthogonal view of an embodiment of a first subsystem 300 of an energy directing system, this first subsystem having zero deflection angle. In an embodiment, the holographic energy directing system 300 is operable to project holographic content along a normal to a light field display surface 301A. The subsystem 300 may include waveguides 302A and 302B that are neighboring elements of a waveguide array 345, which defines an energy directing surface 301A that corresponds to the light field display surface 201A in FIG. 2A, and energy directing surface 101 defined by waveguide layer 104 shown in FIGS. 1A-1E. The waveguide 302A is configured to propagate energy along multiple propagation paths from the energy locations 303 on an energy surface 340 and through the waveguide 302A, while waveguide 302B is configured to propagate energy along multiple propagation paths from the energy locations 305 on the energy surface 340 through the waveguide 302B. The angular direction of each energy propagation path is dependent at least in part on the position of the corresponding energy location. For example, energy from the energy location 304 that passes through the waveguide 302A and is directed by the waveguide 302A is shown as the shaded region 311, which is the energy propagation path from energy location 304, and is defined by energy propagation axis 308. Similarly, energy from energy source location 361 at one edge of the energy source locations 303 is projected by the waveguide 302A along an energy propagation path 362, and energy from energy source location 363 at the opposite edge of the energy source locations 303 is projected along energy propagation path 364. These energy projection paths 362 and 364 define the range of angles 307 for the group of propagation paths associated with waveguide 302A. The energy propagation paths associated with waveguide 302B are similar in behavior. The propagation path from energy location 306 that passes through the waveguide 302B is shown as the shaded region 312, which is the energy propagation path from energy location 306, and is defined by the energy propagation axis 310. The angular range 309 of propagation paths for waveguide 302B is similar to the angular range 307 associated with waveguide 302A. In an embodiment, the energy locations 304 and 306 are located at the approximate center of energy locations 303 and 305 associated with two different waveguides 302A and 302B, respectively. Additionally, the center energy locations 304 and 306 are aligned with the symmetrical center of the waveguides 302A and 302B, respectively. Configured as such, the propagation paths through waveguide 302A and the corresponding energy locations 303 define an angular range 307 of the propagation paths associated with the waveguide 302A, and the energy propagation axis 308 is a line of symmetry for these propagation paths. The propagation paths through waveguide 302B and the corresponding energy locations 305 define an angular range 309 of the propagation paths in one dimension associated with the waveguide 302B, and the energy propagation axis 310 is a line of symmetry for this group of propagation paths. The energy propagation axes 308 and 310, also referred to as center energy propagation paths, are parallel to the normal of the energy directing surface 301A, effecting a zero deflection angle with respect to energy directing surface 301A. The configuration of the waveguides 302A and 302B and energy surface 340 in the holographic energy system 300 may be implemented to effect a zero deflection angle at desired locations. For example, the locations 33, 35 shown in FIG. 2A and location 35 shown in FIG. 2B may all have a zero deflection angle as discussed above, and the zero deflection angle at these locations may be implemented by having the holographic energy systems 200 and 250 include waveguides similar to waveguides 302A, 302B at these locations In an embodiment, the energy propagated through the energy locations 303 may each fill a substantial portion of the aperture of waveguide 302A, and may be blocked from entering the aperture of neighboring waveguide 302B by one of the energy-inhibiting walls 315. Similarly, the energy propagated from the energy locations 305 may each fill a substantial portion of the aperture of waveguide 302B, and may be blocked from entering the aperture of neighboring waveguide 302A by one of the energy-inhibiting walls 315. Note that in this disclosure, most of the time the energy locations on energy surface 340 such as 303 and 305 are referred to as energy sources, but configurations are possible (e.g. light field sensing devices) in which energy propagation paths are incident on the waveguide and the energy locations on the waveguides are energy sensors. In an embodiment, a light field display which also records as well as projects light propagation paths may have groups of energy locations 303 and 305, the groups of energy locations which either all emit or sense electromagnetic energy, or the groups of energy locations comprised of a combination of energy emitters and energy sensors which may be interleaved.

Figure 3B:
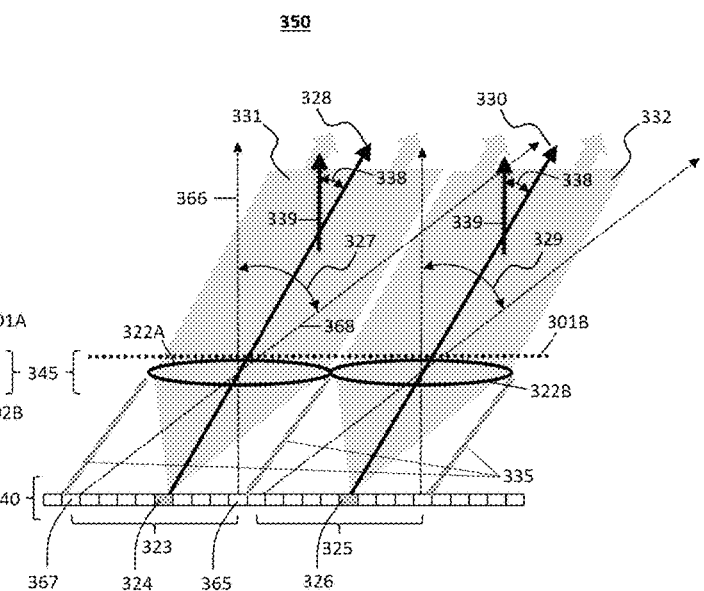
FIG. 3B illustrates an orthogonal view of a subsystem of an energy directing system with non-zero deflection angle, in accordance with the present disclosure.

FIG. 3B illustrates an orthogonal view of an embodiment of a second subsystem 350 of a holographic energy directing system, the second subsystem 350 having non-zero deflection angle. The subsystem 350 may include waveguides 322A and 322B that are neighboring elements of a waveguide array 345, which defines an energy directing surface 301B that may correspond to portions of the display surface 201B in FIG. 2B, or an alternate configuration of the energy directing surface 101 defined by waveguides 104 shown in FIGS. 1A-1E. The waveguide 322A is configured to propagate energy along propagation paths through the energy locations 323 on the energy surface 340, while waveguide 322B is configured to propagate energy through the energy locations 325 on the energy surface 340. The angular direction of energy propagation path is dependent at least in part on the position of the corresponding energy location. The energy from the energy location 324 that passes through the waveguide 322A and is directed by the waveguide 322A is shown as the shaded region 331, which is the energy propagation path from energy location 324 defined by the energy propagation axis 328. Similarly, energy along propagation path 332 from the energy location 326 lies along energy propagation axis 330. Energy from energy source location 365 at one edge of the energy source locations 323 is projected by the waveguide 322A along an energy propagation path 366, and energy from energy source location 367 at the opposite edge of the energy source locations 323 is projected along energy propagation path 368. These energy propagation paths 366 and 368 define the range of angles 327 for the group of propagation paths associated with waveguide 322A. The energy propagation paths associated with waveguide 322B are similar. In an embodiment, the energy locations 324 and 326 are located at the approximate center of energy locations 323 and 325, respectively. Configured as such, all the propagation paths passing through waveguide 322A originating from the corresponding energy locations 323 define an angular range 327, and the energy propagation axis 328 is a line of symmetry for these propagation paths. All the propagation paths through waveguide 322B and originating from the corresponding energy locations 325 define an angular range 329, and the energy propagation axis 330 is a line of symmetry for these propagation paths. The energy projection axes 328 and 330 are also known as center energy projection paths, and the angle 338 they make with the normal 339 to the energy directing surface 301B is called the deflection angle. In contrast to the first subsystem 300, the center energy location 324 of the group of energy locations 323 associated with the waveguide 322A is offset from the symmetrical center of the waveguide 322A. As a result, the energy propagation axis 328 is no longer perpendicular to the energy directing surface 301B and forms a non-zero deflection angle 338 with respect to the normal 339 of the energy directing surface 301B. In a similar way, the center energy location 326 of the group of energy locations 325 associated with the waveguide 322B is offset from the symmetrical center of the waveguide 322B, and the energy propagation axis 330 forms a non-zero deflection angle 338 with respect to the normal 339 of the energy directing surface 301B. The configuration of the waveguides 322A and 322B and energy surface 340 in the holographic energy system 350 may be implemented to effect a non-zero deflection angle at a desired location. For example, the location 33 shown in FIG. 2B has a non-zero deflection angle as discussed above, and the non-zero deflection angle at this location may be implemented by having the holographic energy system 350 include waveguides similar to waveguides 322A, 322B at this location or other locations where a non-zero deflection angle is desired.

As discussed above, in an embodiment, the light rays projected at positions located between the top location 33 and bottom location 35 of the display surface 201B shown in FIG. 2B may have a deflection angle which varies between angle 43 at the top of the display surface 101, and the angle of zero (normal 45 to the display surface) at the bottom of the display surface 101. In such an embodiment, the configuration of the waveguides 302A, 302B, 322A, and 322B may be incorporated to effect the desired variations of the deflection angles. For example, in an embodiment, a holographic energy directing system may include a first deflection angle of zero effected by a waveguide similar to the waveguide 302A or 302B and a second deflection angle that is non-zero effected by a waveguide similar to the waveguide 322A or 322B. In another example, a holographic energy directing system may include a first non-zero deflection angle effected by a waveguide similar to the waveguide 302A or 302B and a second non-zero deflection angle effected by a waveguide similar to the waveguide 322A or 322B where the first and second non-zero deflection angle may be the same or different. In another example, in an embodiment, a holographic energy system may include an array of energy waveguides 302A, 302B, 322A, or 322B comprising waveguides each having an energy propagation axis that defines a deflection angle relative to the normal of the energy directing surface 301B, the deflection angle of the waveguides being different from that of the other waveguides in the array of energy waveguides 345.

As discussed above, a gradient of deflection angles may be desired in some embodiments. To effect a desired gradient of deflection angles, an array of energy waveguides, such as wave guides 302A, 302B, 322A, or 322B, may be configured such that the deflection angle of each immediate subsequent waveguide in a first direction may be configured to be different than the deflection angle of each immediate preceding waveguide. In an embodiment, the deflection angle of each immediate subsequent waveguide in a first direction is greater than the deflection angle of each immediate preceding waveguide in the first direction. In another embodiment, the deflection angle of each immediate subsequent waveguide in a first direction may be configured to be less than the deflection angle of each immediate preceding waveguide in the first direction. In still another embodiment, the deflection angle of two adjacent waveguides can vary substantially. In an embodiment, the gradient of deflection angles may be interrupted at one or more desired locations by a discontinuity of deflection angle changes along a first direction. In an embodiment, the energy propagated through the energy locations 323 may each fill a substantial portion of the aperture of waveguide 322A, and may be blocked from entering the aperture of neighboring waveguide 322B by one of the energy-inhibiting walls 335. Similarly, the energy propagated through the energy locations 325 may each fill a substantial portion of the aperture of waveguide 322B, and may be blocked from entering the aperture of neighboring waveguide 322A by one of the energy-inhibiting walls 335.

Figure 3C:
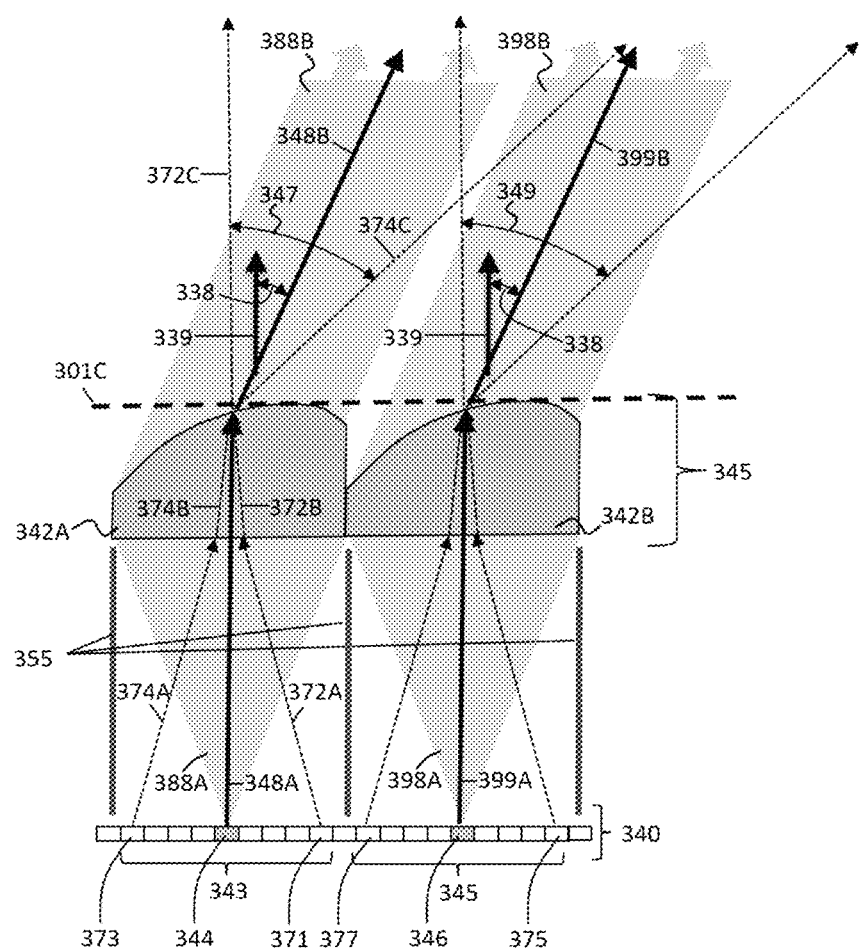
FIG. 3C illustrates an orthogonal view of asymmetrically constructed energy waveguides, in accordance with the present disclosure.

FIG. 3C illustrates an embodiment of asymmetrically constructed energy waveguides that may be incorporated into an energy directing system, like system 250, for effecting a non-zero deflection angle. Waveguides 342A and 342B are neighboring elements of an energy waveguide array 345 and define an energy directing surface 301C. In an embodiment, energy directing surface 301C is a light field display surface. Energy directing surface 301C may correspond to portions of the display surface 201B in FIG. 2B, or an alternate configuration of the energy directing surface 101 shown in FIGS. 1A-1E. The energy waveguide 342A directs energy through energy locations 343 on energy s surface 340, while waveguide 342B directs energy through energy source locations 345 on energy surface 340.

The energy from the energy location 344 that approaches the waveguide 342A is represented by the shaded region 388A, centered on axis 348A, and this energy is redirected by the waveguide 342A into the propagation path 388B, which is the shaded region that leaves the waveguide 342A centered on axis 348B. Similarly, energy from energy location 346 that approaches the waveguide 342B is represented by the shaded region 398A, centered on axis 399A, and this energy is redirected by the waveguide 342B into the propagation path 398B, which is the shaded region that leaves waveguide 342B, centered on axis 399B. In a similar way, energy from energy source location 371 at one edge of the energy source locations 343 is propagated towards the waveguide 342A along axis 372A, is refracted within the waveguide along axis 372B, and leaves the waveguide 342A along axis 372C. Energy from energy source location 373 at the opposite edge of the energy source locations 343 is propagated along axis 374A toward waveguide 342A, is refracted within the waveguide along axis 374B, and exits the waveguide along axis 374C. These energy propagation paths 372C and 374C define the range of angles 347 for the group of all propagation paths associated with waveguide 342A. The energy projection paths associated with waveguide 342B are similar. Note that in contrast to FIG. 3B, the center energy source location 344 of the group of energy source locations 343 associated with the waveguide 342A is directly underneath the center of the waveguide 342A, and the surface of the waveguide near light field display surface 301C is asymmetric. As a result, the energy propagation axis 348A for the energy from source 344 is refracted by the waveguide 342A into energy propagation axis 348B, which is roughly the center of the angular range 347 of the group of energy propagation paths originating from all the energy source locations 343 and passing through the waveguide 342A. This means that from the discussion above, 348B is the energy propagation axis for the energy projected by waveguide 342A, and this energy propagation axis 348B is not perpendicular to the light field display surface 301C, making a non-zero angle 338 with respect to the normal 339 of the light field display surface. Similarly, 399B is the energy propagation axis for the energy projected by waveguide 342B, as it lies substantially near the center of the angular range 349 for all the projection energy paths from the energy source locations 345 propagated by the waveguide 342B, and this energy propagation axis 399B is not perpendicular to the energy directing surface 301C, making a non-zero angle 338 with respect to the normal 339 of the energy directing surface. Energy from locations 343 associated with waveguide 342A may be blocked by one of the energy-inhibiting structures 355 form reaching the aperture of the neighboring waveguide 342B and vice versa.

While FIGS. 3B and 3C show embodiments of waveguides for effecting non-zero deflection angles, other embodiments are also possible. For example, in an embodiment, the waveguides may be tilted at an angle relative to a normal of the energy surface 340. Other examples may include waveguides that contain sloped sections or facets, contain multiple elements, or otherwise are modified from the configurations shown in FIGS. 3B and 3C in order to direct energy at a non-zero deflection angle relative to the display surface. The waveguides may be configured for an arrangement of energy locations which is distributed about the center of each waveguide or offset from the center of each waveguide. These waveguide solutions may be combined with other optical elements, including layers of glass with varying indices of refraction, mirrored layers, thin films, diffraction gratings, holographic optical elements, metamaterial layers, or the like in order to achieve a non-zero deflection angle.

Figure 4A:
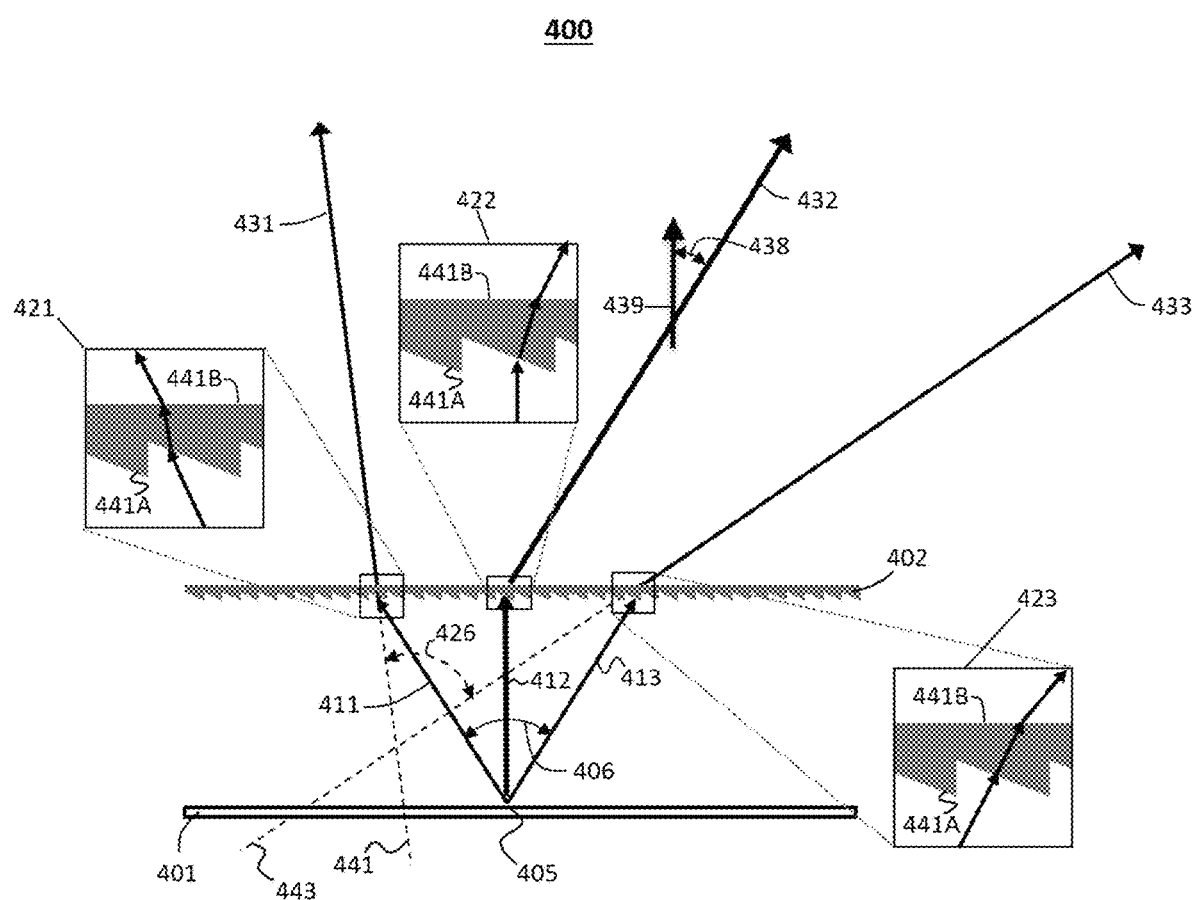
FIG. 4A illustrates an orthogonal view of an embodiment of an energy directing system having an optical element for redirecting energy along a plurality of deflected propagation paths, in accordance with the present disclosure.

FIGS. 3B and 3C show example embodiments with a deflection angle built into the surface of an energy-directing device. In contrast, FIG. 4A illustrates an orthogonal view of an embodiment of a holographic energy system with a deflection angle achieved using a layer of optic elements placed over the energy directing surface 401, such as a light field display surface, to deflect light rays once they leave the energy directing surface 401. The energy leaving energy directing surface 401 at the location 405 are spread over the angular range 406, including the propagation paths 411, 412, and 413. The energy directing surface 401 may have zero deflection angle, and constructed in a similar manner to the energy-directing surfaces 301A in FIG. 3A, 201A in FIG. 2A, or 101 in FIGS. 1A-1E discussed above. For example, a waveguide such as 302A or 302B shown in FIG. 3A may be located at the location 405 of the energy directing surface 401 to effect a zero deflection, whereby the energy propagation axis 412 is parallel with a normal to the display surface 401. An optical element may comprise a layer of refractive optics 402 to refract the received energy propagation paths from the energy directing surface 401, changing the direction of many incident energy propagation paths. In the example illustrated in FIG. 4A, propagation path 411 is deflected into propagation path 431, propagation path 412 is deflected into propagation path 432, and propagation path 413 is deflected along propagation path 433. The close-up views 421, 422, and 423 of the optical element 402 show energy propagation paths that are bent twice as they pass through the higher refractive index of the optical element 402, which may be a refractive element, at first surface 441A, and then again at second surface 441B. The paths 411, 412, and 413 are first bent toward the normal of the first surface 441A, as they travel into the higher-index material of the refractive material 402 at surface 441A, and then away from the normal of the interface as they leave the higher-index material of the refractive optics 402 at second surface 441B. The result is that the angular range 406 of the energy propagations paths leaving the energy directing surface 401, which was symmetric around the energy output axis 412, has been mapped and transformed to angular range 426, which has an energy propagation axis 432 which is the approximate axis of symmetry for the plurality of deflected propagation paths and is tilted at an angle 438 relative to the normal 439 to the energy directing surface 401. In other words, the energy rays have all been deflected by a non-zero deflection angle, so that the holographic content propagates in a generally tilted direction relative to the normal to the display surface. Note that while this example illustrated in FIG. 4A shows how rays of light from an energy projecting surface may be deflected by refractive optics using prisms with varying properties, it is possible to use layers of glass with varying indices of refraction, mirrored layers, thin films, diffraction gratings, diffractive optics, holographic optical elements, single lenses, multi-element lenses, liquid lenses, deformable surfaces, metamaterial surfaces, or the like. The layer of optics may be optimized for a particular viewing geometry and coupled to a light field display surface allowing viewing volume customization with relatively lesser expense than tailoring the deflection angle of waveguides across the display surface.

Figure 4B:
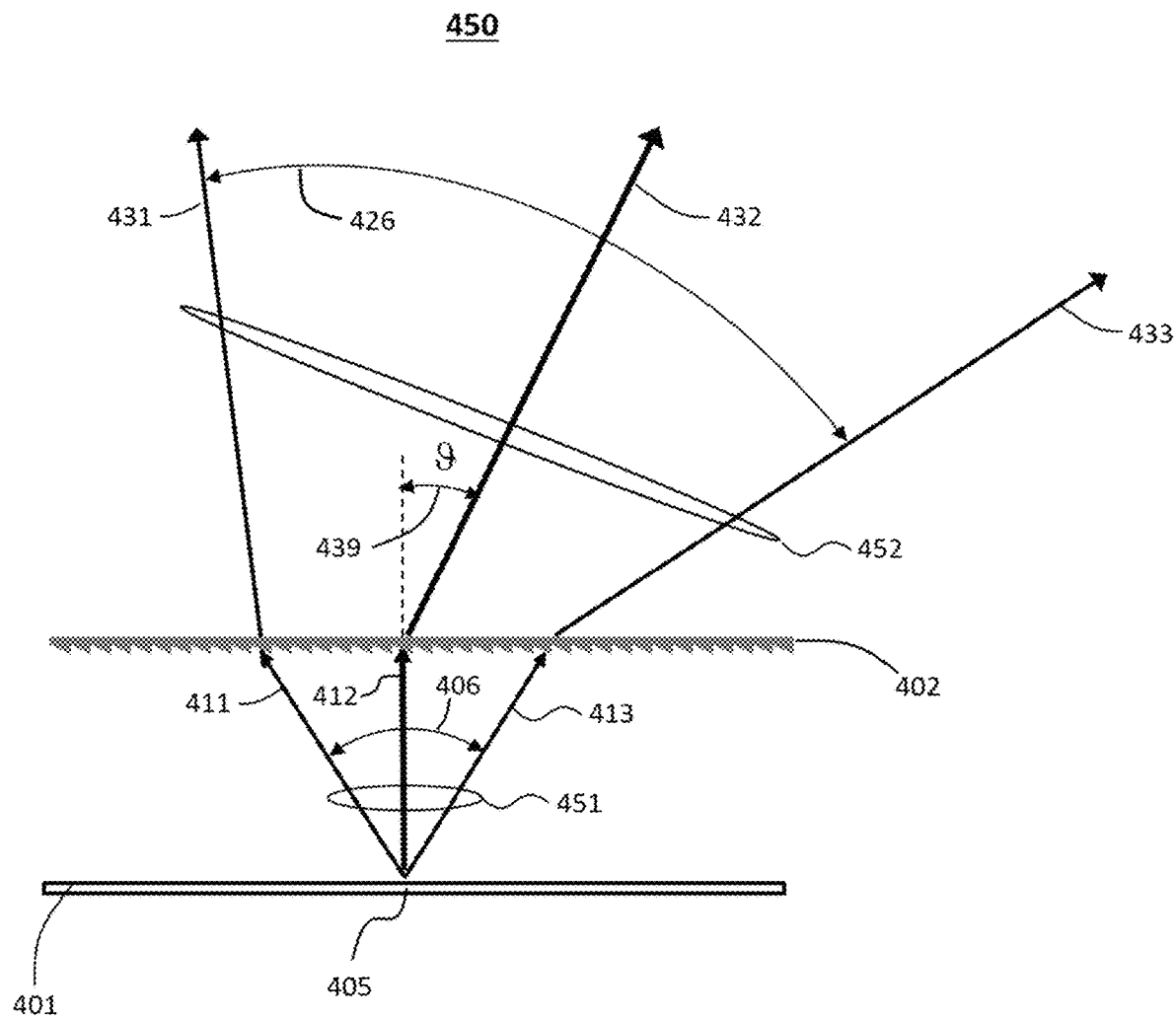
FIG. 4B illustrates the deflection angles of the energy directing system shown in FIG. 4A, in accordance with the present disclosure.

FIG. 4B illustrates the same optical system shown in FIG. 4A, showing the deflection angle ϑ 439 that the energy propagation axis 432 makes with the normal to the energy directing surface 401. The group of propagation paths 451 from location 405 on the display surface 401 are grouped around the input optical axis 412 as they approach the optical element 402, and they are redirected to group 452 centered on optical axis 432 as they leave the optical element 402. The angular range 406 of input propagation paths 451 may be substantially the same as the angular range 426 of the output propagation paths 452, or they may differ, depending on the implementation.

The example of FIG. 4B shows a planar layer of optical elements used to achieve a non-zero deflection angle of energy from a light field display across its surface. In some embodiments, the light field display is configured to propagate more than one type of energy. For example, the light field display may project two types of energy, such as acoustic energy and electromagnetic energy. In some embodiments, the acoustic energy is directed from multiple locations on one or more surfaces that are disposed a short distance from the display surface 401, and these locations direct the acoustic energy into the holographic object volume. In other embodiments, the display surface 401 itself contains both acoustic energy transducers as well as electromagnetic waveguides, projecting both electromagnetic energy and acoustic energy. The acoustic energy may be projected from transducer or acoustic waveguide locations between the electromagnetic waveguide elements of the waveguide array (e.g. 345 in FIGS. 3A, 3B, and 3C) on the display surface, and may help form structures that inhibit energy (e.g. 315 in FIG. 3A or 355 in FIG. 3C) from being transported from one electromagnetic waveguide element to another.

In an embodiment, a spatially separated array of transducers that project ultrasonic acoustic energy can be configured to create three-dimensional haptic shapes and surfaces in mid-air. Phase delays and amplitude variations across the array can assist in directing the ultrasound from multiple sources to interfere at one or more specific haptic locations which may provide the sensation of touch. These haptic locations may coincide with projected holographic objects. Generally, acoustic waveguides or transducers placed on a planar surface, whether the surface is apart from the display surface or integrated into the display surface, tend to project the acoustic energy outward and normal to that surface. Ideally, an array of deflection angles for those sound-producing locations would enable the sound to be directed towards convergence points from multiple locations on the planar surface, which can enable volumetric tactile surfaces to form.

In an embodiment, deflection angles for both electromagnetic and acoustic energy may be achieved with metamaterials. These metamaterials are primarily two-dimensional patterned surfaces called metasurfaces with engineered subwavelength cells or structures that may be used as materials that redirect energy wave fronts. This deflection of an input beam of energy may be done by arranging for graded phase shifts along the profile of the metamaterials. One conventional approach of metasurface design is to effect local phase modulation, which dictates the behavior of outgoing waves according to a generalized Snell's Law (GSL). This has been used in optics to design structures such as lenses and beam splitters. In acoustics, the phase shifts within metasurfaces have been used to manipulate wave fronts and to absorb sounds.

Such approaches have limitations in efficiency of scattering, which may be overcome by using metamaterials that are known as bi-anisotropic materials. In bi-isotropic electromagnetic media, the electric and magnetic fields are coupled by intrinsic constants of the media. If the coupling constants depend on the direction within the media, the media is referred to as bi-anisotropic. A similar phenomena occurs in acoustics for inhomogeneous elastic materials that display Willis coupling, in which stain is coupled to momentum and stress is coupled to velocity in the frequency domain.

A bi-anisotropic electromagnetic response can be implemented by bi-anisotropic metasurfaces, where the scattered electromagnetic fields are different depending on the direction of illumination. For electromagnetic metasurfaces, typical solutions are based on cascaded impedance layers. These structures have been experimentally verified to deflect light with a high efficiency, focus light, and achieve other optical functionalities.

Figure 4C:
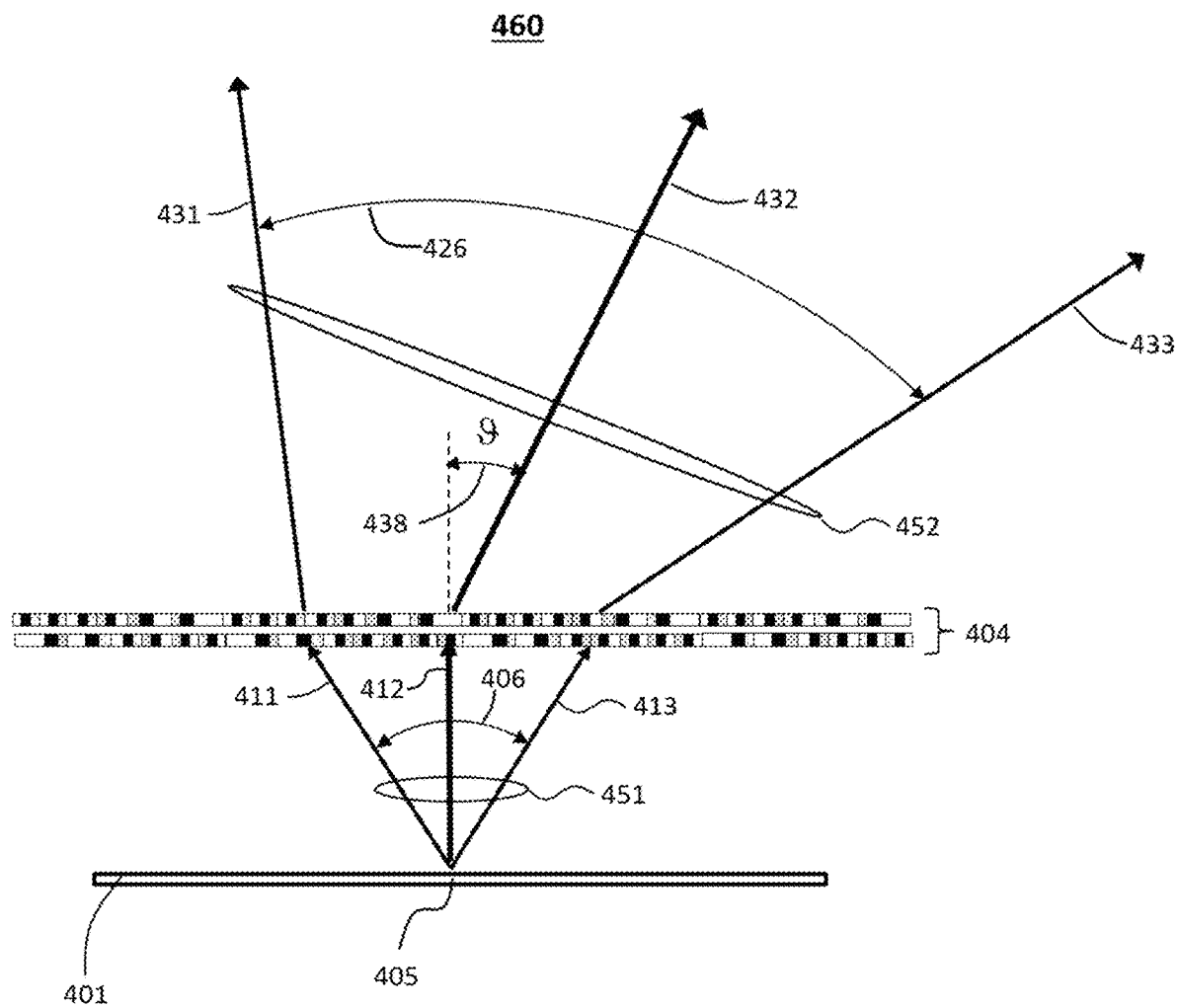
FIG. 4C illustrates an embodiment of an energy directing system having a layer of meta surface, in accordance with the present disclosure.

FIG. 4C illustrates a holographic energy system similar to that shown in FIG. 4B, but with one or more optical metasurfaces 404 taking the place of the optical element 402 shown in FIG. 4B. The same numerals are assigned to the same components in FIGS. 4B and 4C. In the example shown in FIG. 4C, one or more layers of metasurfaces 404 are used to achieve the deflection angle ϑ 438. The metamaterials may achieve local phase modulation according to a generalized Snell's law, or have a higher efficiency for deflecting a beam of light by being constructed of structures made of bi-isotropic materials or bi-anisotropic materials. If individual metasurface regions are individually addressable and configurable, the deflection angle ϑ 438 may be programmed across a range of angles at each of these regions.

In acoustics, recently it has been shown that using bi-anisotropic resonators achieved with specific resonator geometry dimensions, an incident plane sound wave may be redirected by large angles of greater than 60 deg with a power efficiency of greater than 90% [1]. Such a technology is a candidate for generating a gradient deflection angle for sound wave fronts across a surface containing an array of sound generators such as transducers. Such a gradient deflection angle may be used to assist the focus of multiple ultrasonic wave fronts to a common point of interference, achieving a volumetric tactile surface, which may provide the sensation of touch as described above.

Figure 4D:
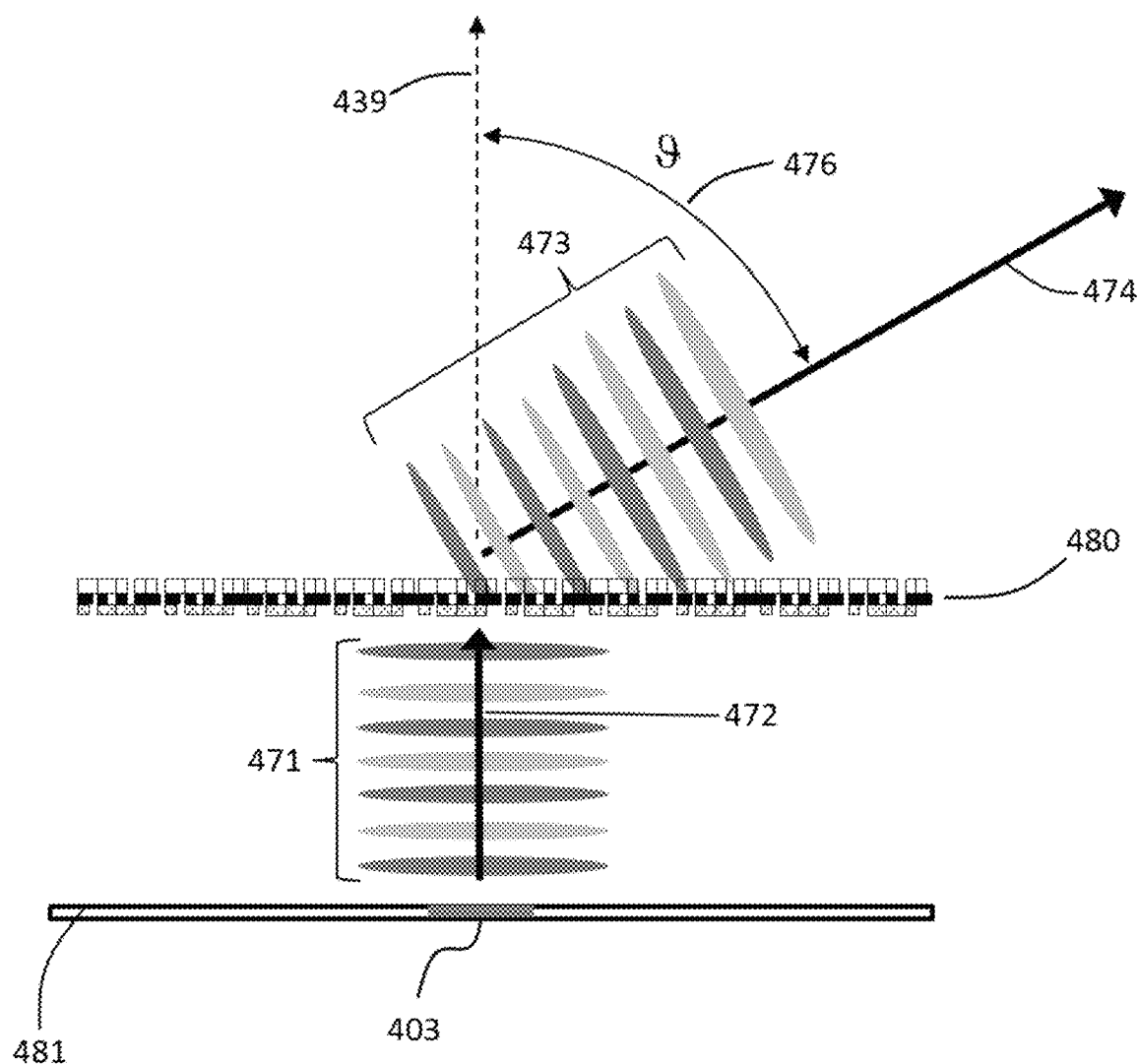
FIG. 4D illustrates an embodiment of an energy directing system configured to direct mechanical energy, in accordance with the present disclosure.

FIG. 4D is an example of a system which deflects an incoming sound wave 471 into an output sound wave 473 with a substantial deflection angle ϑ 476. FIG. 4D represents a deflection element with a single deflection location configured to receive mechanical energy from a single energy source location, and deflect the received mechanical energy along deflected propagation paths. The sound wave is produced by an acoustic waveguide or an acoustic transducer located at position 403 on a surface of sound energy sources 481. The surface 481 may be a surface disposed next to a light field display surface comprised of many acoustic waveguides or transducers, or the surface 481 may be a dual-energy light field display surface comprised of both electromagnetic waveguides as well as acoustic energy transducers, wherein the electromagnetic waveguides and the acoustic energy transducers may be interleaved. Sound wave 471 is produced along the energy axis 472, normal to the surface 481, and parallel with the normal 475, and is deflected by one or more metasurface layers 480 into sound wave 473 along axis 474. The angle ϑ 476 between the energy propagation axis 474 of the deflected sound wave and the normal 439 to the surface of sound sources 481 is the deflection angle. If individual metasurface regions are individually addressable and configurable, the deflection angle ϑ 476 may be programmed across a range of angles at each of these regions. The one or more metasurface layers 480 may be made of a 2D patterned surface of arrangements of sub-wavelength cells, or acoustic cells that are made from bi-anisotropic metamaterials.

Figure 5A:
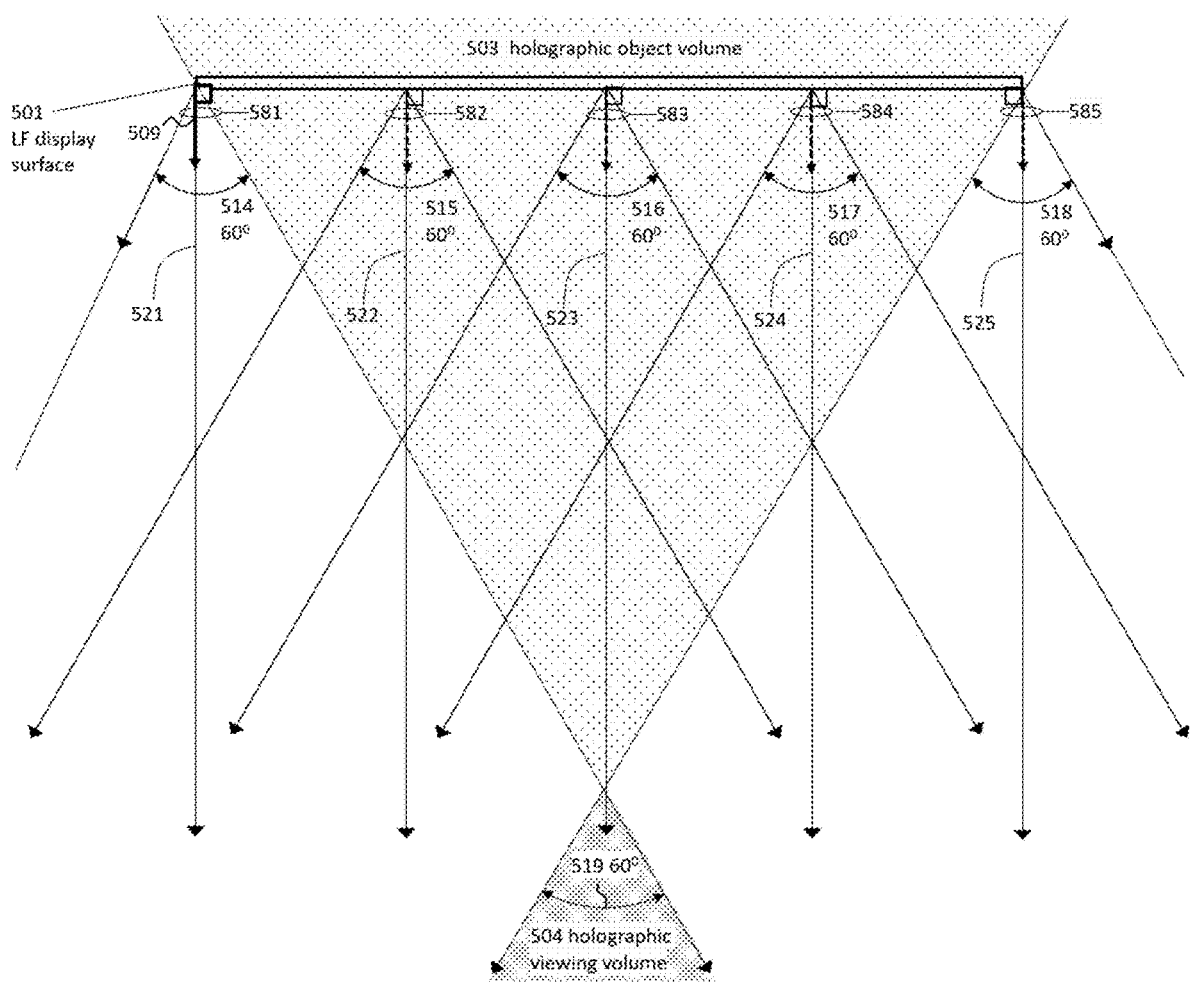
FIG. 5A illustrates a top view of an embodiment of an energy directing system having an energy directing surface with a 60-degree field-of-view and zero deflection angle, in accordance with the present disclosure.

A gradually changing deflection angle, called a deflection gradient, may be used across a display surface to increase the field of view for a specific viewing volume, or bring the viewing volume closer to the display surface. FIG. 5A illustrates a top view of an embodiment of an electromagnetic energy directing system, which may be any energy directing system discussed in the present disclosure, including a light field display. In an embodiment, the energy directing system of FIG. 5A includes an energy projecting surface 501 with a 60-degree angular energy propagation range at various surface locations of the energy projecting surface 501 and no deflection angle. In an embodiment, the energy surface 501 may incorporate the configurations of energy directing surfaces similar to 101 of FIGS. 1B and 1E, the light field display surface 201A in FIG. 2A, and surface 301A in FIG. 3A. In an embodiment, the groups of energy propagation paths of the surface 501 are directed normal to the surface 501, effecting zero deflection angles. Each group of energy propagation paths with energy propagation axes 521-525 is distributed over a 60-degree angular range 514-518, respectively. The resulting holographic viewing volume 504, where energy from all different surface locations overlap, and where holographic objects located everywhere in the holographic object volume 503 can be seen, has the same 60-degree field-of-view 519. Note that the holographic viewing volume 504 may not be closer than roughly the width of the display for this geometry. In this configuration, the holographic object volume is quite large geometrically, but it may be limited by the maximum projection distance from the light field display surface 501.

Figure 5B:
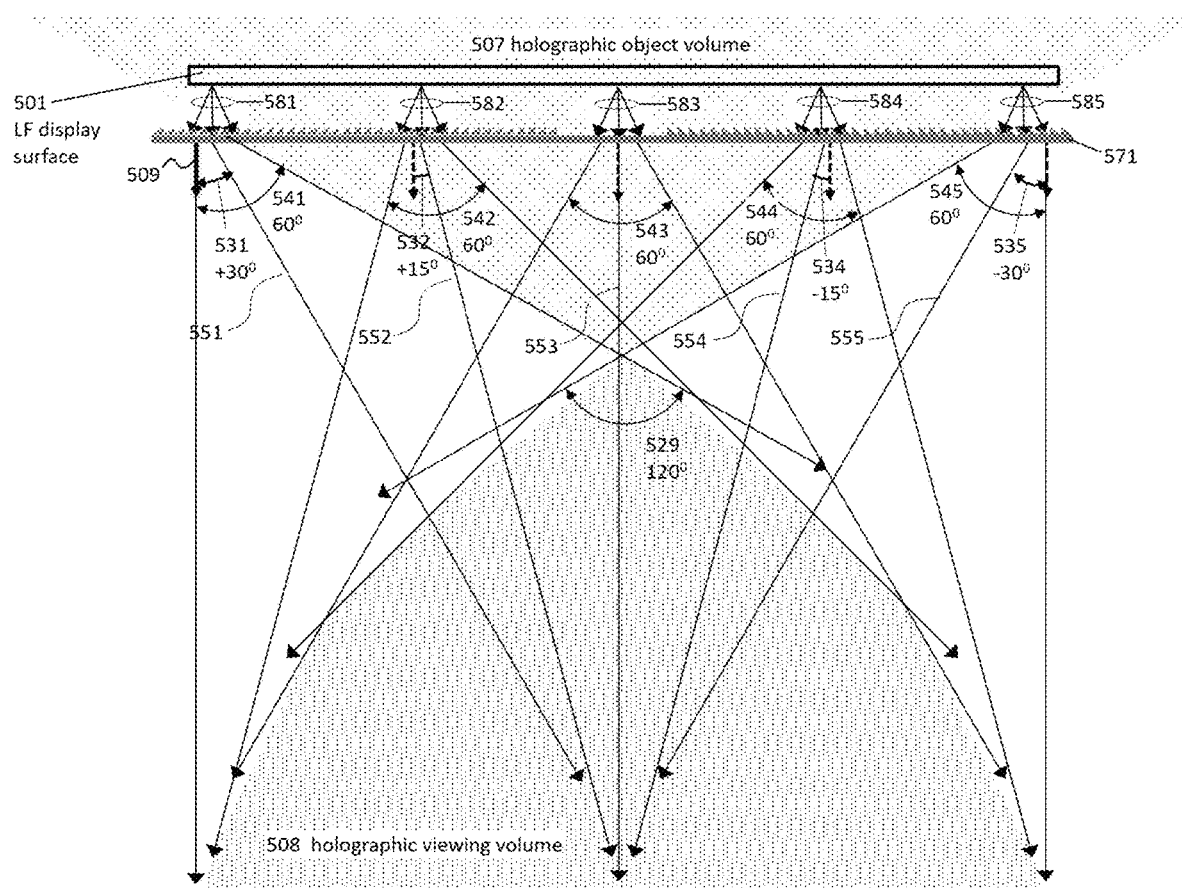
FIG. 5B illustrates a top view of an embodiment of an energy directing system having an energy directing surface and an optical element configured to effect variable non-zero deflection angle as a function of position in a lateral direction, in accordance with the present disclosure.

FIG. 5B shows the same display surface 501 as that shown in FIG. 5A but with gradient deflection angles achieved across the display surface that is realized with an optical deflection layer 571 similar to layer 402 shown in FIGS. 4A-4B placed directly in front of the display surface 501, allowing the holographic viewing volume 508 to be positioned much closer to the light field display surface 501. In FIG. 5B, energy propagation groups 581-585 each produced symmetrically about an energy propagation axis parallel to the normal 509 of the display surface 501 with zero deflection angle are almost all deflected by the optical deflection layer 571 by deflection angles 531-535 which range from +30 degrees on the left side of the light field display surface to −30 degrees on the right side. Energy propagation paths 581 produced symmetrically about an energy propagation axis normal 509 to the display surface 501 are all deflected by an angle 531 of 30 degrees by the deflection layer 571 into deflected energy propagation paths centered on axis 551, toward the center holographic viewing volume 508. Similarly, energy rays 582 are deflected by 15 degrees into energy propagation axis 552; energy rays 583 are undeflected and continue along energy propagation axis 553, energy rays 584 are deflected by −15 degrees into energy propagation axis 554, and energy rays 585 are deflected by −30 degrees into energy propagation axis 555, in such a way that each of the deflected propagation axes 551-555 point close to the middle of the holographic viewing volume 508, independent of location on the display surface. At intermediate points on the light field display surface 501, the deflection angle may be an interpolated value of the deflection angles just given. In other words, the deflection angle may continuously change across position on the energy directing surface, or it may be grouped in regions and have borders of discontinuity. The deflection angle is shown to change in only one dimensions in FIG. 5B, but in general the deflection angle may be any continuous or non-continuous function of position across the energy directing surface. In the configuration shown in FIG. 5B, the angular spread before and after deflection for energy propagation paths 581-585 is an angle 541-555 of 60 degrees.

The result is that bundles of energy propagation paths centered on energy propagation axes are directed toward the holographic viewing volume 508 from each portion of the light field display surface, resulting in a field-of-view that can be as much as angle 529 equal to about 120 degrees, and a holographic viewing volume 508 which may have the proximity to the display surface 501 of a fraction of the horizontal width of the display surface. Notice that light rays leaving the edges of the display surface may not be directed into a horizontal area that is wider than the width of the display surface, resulting in the avoidance of energy projected away from the holographic viewing volume 508.

Examining the differences between the embodiments illustrated in FIG. 5A and FIG. 5B, we see that a gradient deflection angle may be used to increase the field-of-view of the viewing volume for viewers, decrease the separation between the energy projecting surface and the viewing volume, and thus increase the proximity of holographic objects to the viewing audience. The holographic object volume is smaller in FIG. 5B than in FIG. 5A, but it can be customized to accommodate the maximum projected distance for the light field display. The design parameters for the display may take this into account, balancing mutually competing requirements of projection distance, resolution, and field-of-view.

Figure 5C:
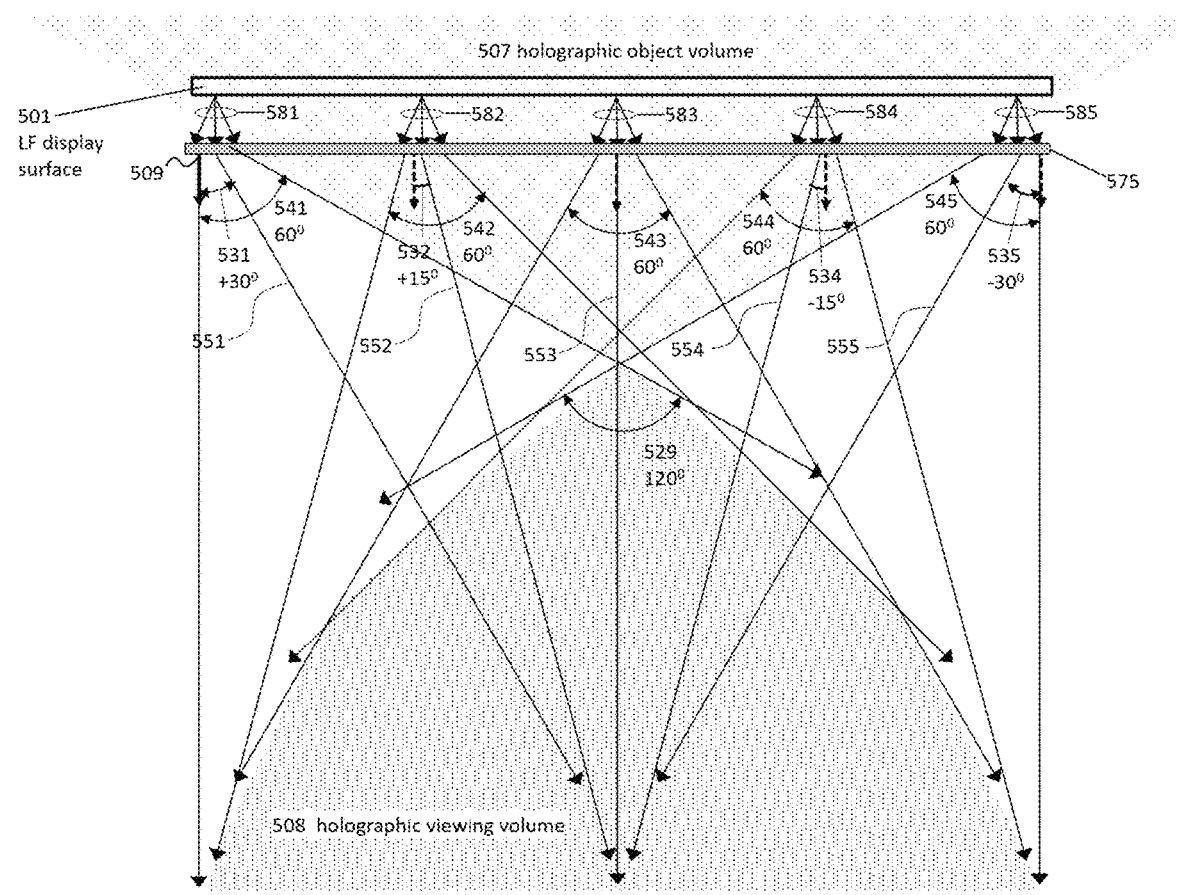
FIG. 5C illustrates a top view of another embodiment of an energy directing system having an energy directing surface and an optical element configured to effect variable non-zero deflection angle as a function of position in a lateral direction, in accordance with the present disclosure.

FIG. 5C is the same holographic display system shown in FIG. 5B, except that the layer of deflection optics 571 in FIG. 5B has been replaced with one or more layers 575 of gradient metasurfaces that produce the same deflection angles. Otherwise the same numerals are assigned to the same components in FIGS. 5B and 5C. The gradient metasurface layer 575 may deflect light rays by an angle which is tunable, similar to the behavior of the metamaterial surface 404 shown in FIG. 4C. The metasurface layer 575 may change the direction of the rays of light by achieving local phase modulation according to a generalized Snell's law, or have a higher efficiency for deflecting a beam of light by being constructed of structures made of bi-isotropic metamaterials or bi-anisotropic metamaterials.

Figure 5D:
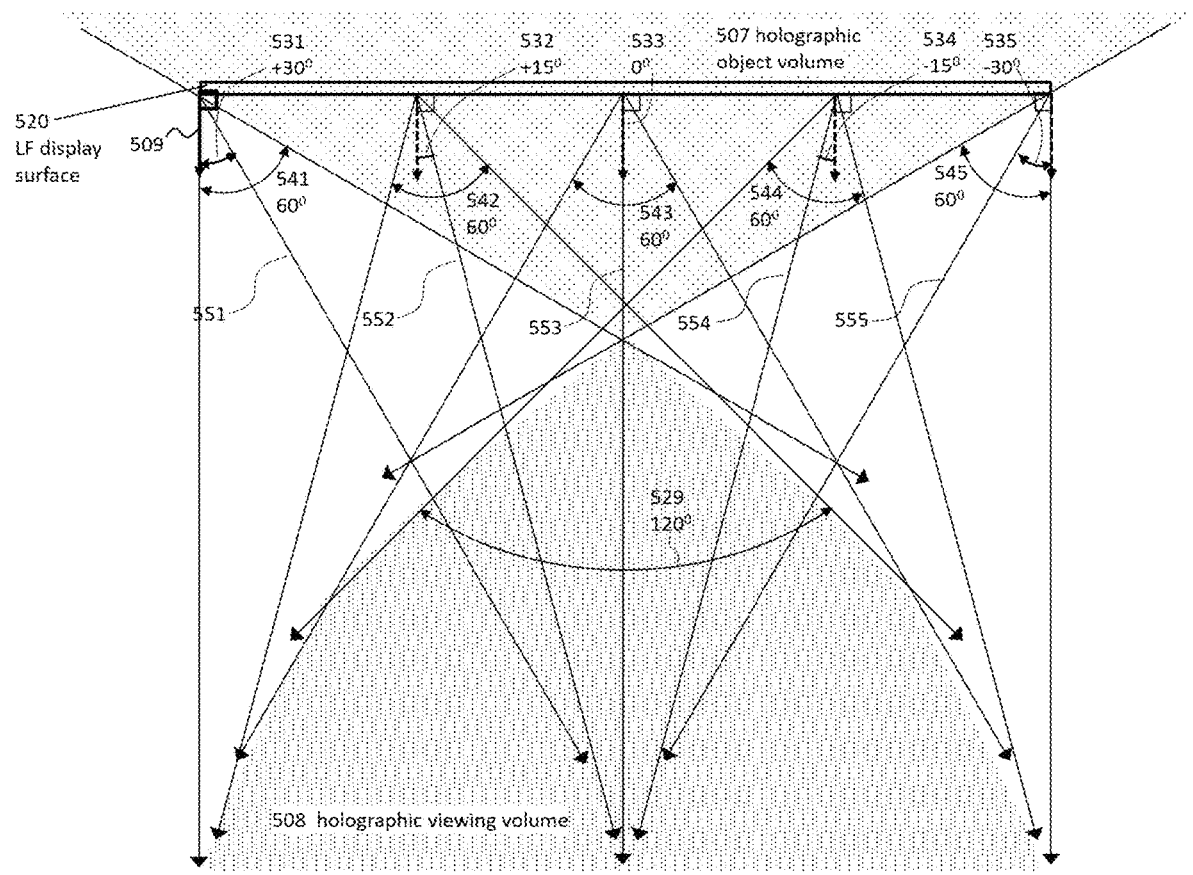
FIG. 5D illustrates a top view of an embodiment of an energy directing system having an energy directing surface configured to effect variable non-zero deflection angle as a function of position in a lateral direction, in accordance with the present disclosure.

As shown in FIGS. 3B and 3C, a deflection angle on a light field display may be achieved using an array of waveguides, wherein each waveguide is configured to propagate energy through multiple energy locations and produce a group of energy projection paths that are centered on an energy propagation axis of symmetry that is not normal to the plane of the waveguides. FIG. 5D illustrates a top view of an embodiment of an energy projection surface 520 configured to have variable non-zero deflection angles as a function of location on the energy projection surface, allowing the holographic viewing volume to be positioned much closer to the energy projection surface than if no deflection angle was used. The same numerals are assigned to the same components in FIGS. 5C and 5D. The holographic system of FIG. 5D is almost identical to that shown in FIG. 5C, except that the gradient deflection angle in FIG. 5D is achieved with the waveguides that form the display surface 520, rather than a surface of metamaterials 509 disposed in front of the display surface 501. The energy directing display surface 520 may be comprised of waveguides similar to 322A and 322B forming the energy directing surface 301B shown in FIG. 3B, waveguides similar to 342A and 342B forming energy directing surface 301C shown in FIG. 3C, some combination of these waveguides with various deflection angles, or some other types of waveguides.

There are additional embodiments of a light field display surface that may be used to increase the field of view and the proximity of projected holographic objects to the viewing volume, or in other words, increase the immersive experience for the viewer. An embodiment which contains a curved surface which surrounds the front of the audience in an arc is one embodiment. In other embodiments, one or more display surfaces may be placed at an angle to a central display surface. This allows the resulting aggregate display surface to surround the viewing volume, to bring holographic objects closer to that volume, and achieve an increased field-of-view. Using flat surfaces angled with respect to one another allows multiple identical panels to be used in a configuration so that the full display surface may be constructed in a modular fashion and be optimized quickly for specific viewing volume requirements.

Figure 5E:
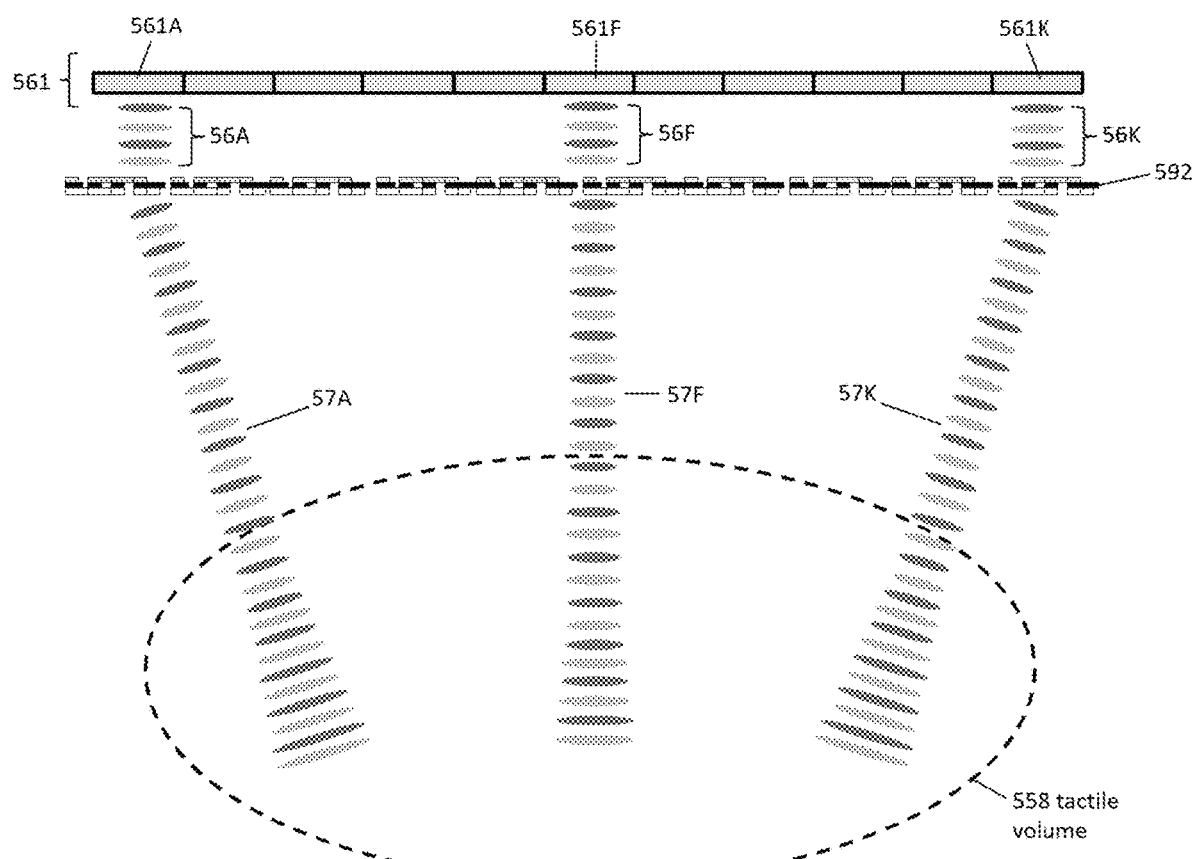
FIG. 5E illustrates view of an embodiment of an energy directing system configured to direct mechanical energy, in accordance with the present disclosure.

The concept of a deflection angle as a function of position on the energy-directing surface may be implemented to the propagation of mechanical energy. A spatially separated array of locations that project acoustic mechanical energy may be configured to create three-dimensional haptic shapes and surfaces in mid-air. In some embodiments, phase delays and amplitude variations across the array can assist in creating these haptic shapes. In some applications, it may be beneficial to be able to tilt the sound emitted from the sound energy locations at an angle toward a tactile volume. FIG. 5E shows a top-down orthogonal view of an acoustic mechanical energy directing device comprised of three acoustic mechanical energy sources 561A, 561F, and 561K on an acoustic energy layer 561 producing sound waves 56A, 56F, and 56K, respectively, where the sound waves are received and deflected into sound waves 57A, 57F, and 5K, respectively, by a static acoustic deflection layer 592 toward a tactile volume 558. The acoustic energy sources 561A, 561F, and 561K may be acoustic transducers that are similar to the acoustic energy source located at position 403 shown in FIG. 4D. The static acoustic deflection layer 592 may be a metasurface made of metamaterials, similar to 480 discussed in reference to FIG. 4D, and may assist in directing sound wave fronts toward an area where tactile surfaces are generated. In an embodiment, the acoustic energy directing device shown in FIG. 5E may be used together with a light field display to generate tactile surfaces which are coincident with holographic objects. In another embodiment, the acoustic energy directing device shown in FIG. 5E is transparent to light and may be placed over the energy directing surface of a light field display to create a dual energy directing device which displays holographic objects and generates tactile surfaces.

Figure 5F:
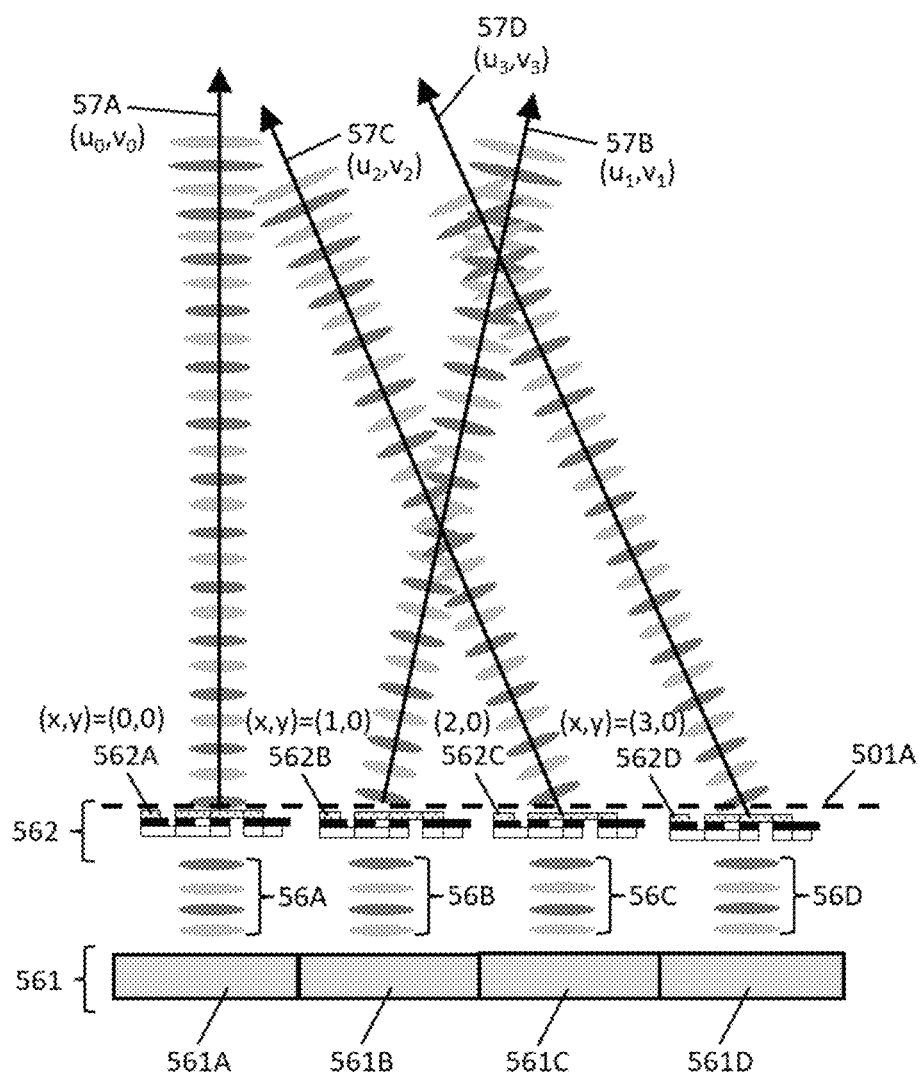
FIG. 5F shows an orthogonal view of a four-dimensional acoustic energy directing system comprised of a deflection element, in accordance with the present disclosure.

It is possible to construct a reconfigurable four-dimensional (4D) acoustic energy field from an array of reconfigurable individual acoustic energy deflecting devices placed over an array of individual acoustic energy sources. FIG. 5F shows an orthogonal view of a 4D acoustic energy directing system comprised of a deflection element providing an array 562 of reconfigurable acoustic energy deflecting locations 562A-D placed over an array 561 of acoustic energy sources 561A-D. The reconfigurable acoustic energy deflecting locations 562A-D may be provided by a deflection element comprised of individual devices, or individual sites on one or more substrates, where each substrate contains multiple sites. The energy deflecting locations 562A-D may be metasurfaces made of metamaterials, described above, and may be similar to those shown on layer 480 of FIG. 4D. Energy source locations 561A-D project sound waves 56A-D, respectively, which are each received and deflected by acoustic energy deflecting locations 562A-D into sound waves 57A-D with a deflected propagation direction. Each acoustic energy deflecting location 562A-D is associated with at least one acoustic energy propagation path with a two-dimensional angular coordinate (u, v), and a two-dimensional coordinate (x, y) that determines position on the energy-directing surface 501A, Together these coordinates form a four-dimensional coordinate (x, y, u, v) for each acoustic energy propagation path. In FIG. 5F, the positional coordinates for the sound propagation paths 57A-D are (x, y)=(0,0), (1,0), (2,0), and (3,0), and the respective angular coordinates are (u,v)=($u_0$,$v_0$), ($u_1$,$v_1$), ($u_2$,$v_2$), and ($u_3$,$v_3$), resulting in 4D coordinates=(0,0,$u_0$,$v_0$), (1,0,$u_1$,$v_1$), (2,0,$u_2$,$v_2$), and (3,0,$u_3$,$v_3$), respectively. In the embodiment shown in FIG. 5F, each acoustic energy deflecting location 562A-D deflects the energy from only one sound energy location 561A-D, but it is possible for each sound deflecting location to direct multiple sound sources into multiple propagation paths, each with a (u, v) coordinate. Such an energy directing system may look very similar to a 4D light field display system shown in FIGS. 1B and 1E.

Figure 5G:
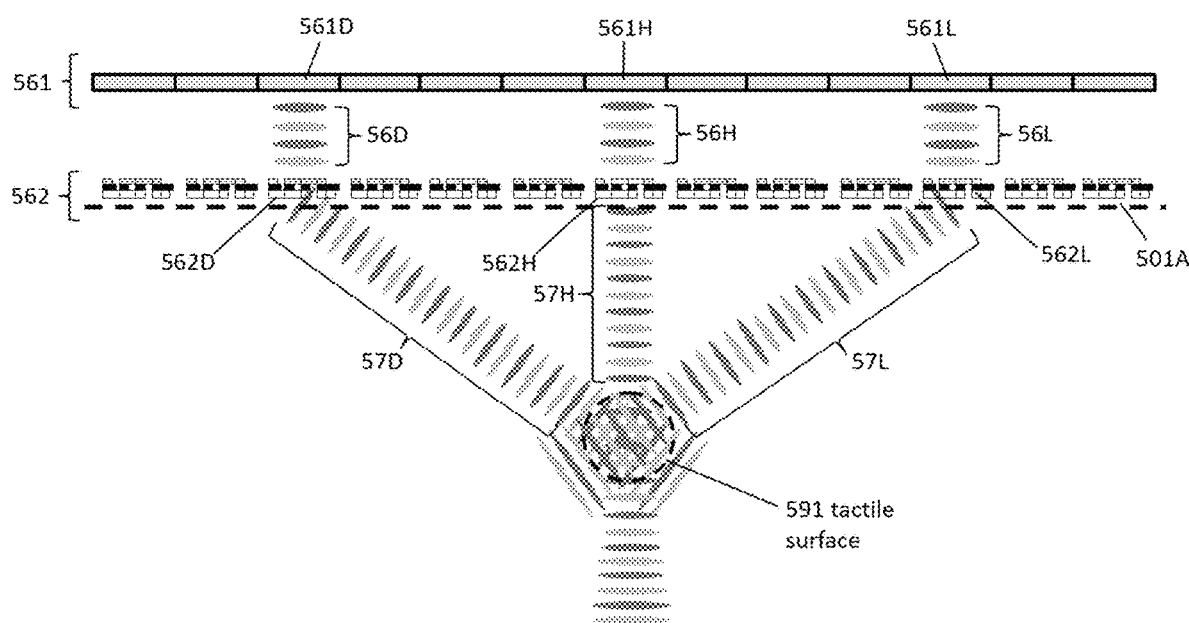
FIG. 5G shows the acoustic energy directing system shown in FIG. 5F generating a tactile interface, in accordance with the present disclosure.

FIG. 5G shows how the 4D acoustic energy directing system shown in FIG. 5F may be used to generate a tactile interface. In FIG. 5G, the multiple sources of acoustic energy 56D, 56H, and 56L are produced by energy source locations 561D, 561H, and 561L on plane 561, and deflected by acoustic energy deflecting locations 562D, 562H, and 562L on plane 562 into sound waves 57D, 57H, and 57L. These sound waves 57D, 57H, and 57L converge, producing a tactile interface 591. In one embodiment, the sound waves are ultrasonic waves, and upon interfering produce a much lower-frequency wave which may produce a tactile sensation. The energy directing system shown in FIG. 5G may be disposed close to the plane of a light field display surface, but completely offset from it spatially to avoid blocking the light from the display surface. The acoustic energy source plane 561 and the acoustic deflection plane 562 may be transparent to light from a light field display. The tactile surface 591 may be coincident with a holographic object projected by a light field display. The acoustic energy deflecting locations 562D, 562H, and 562L on layer 592 may each deflect the sound waves by achieving local phase modulation according to a generalized Snell's law, or have a higher efficiency for deflecting a beam of sound by being constructed of structures made of bi-isotropic acoustic metamaterials or bi-anisotropic acoustic metamaterials.

Figure 5H:
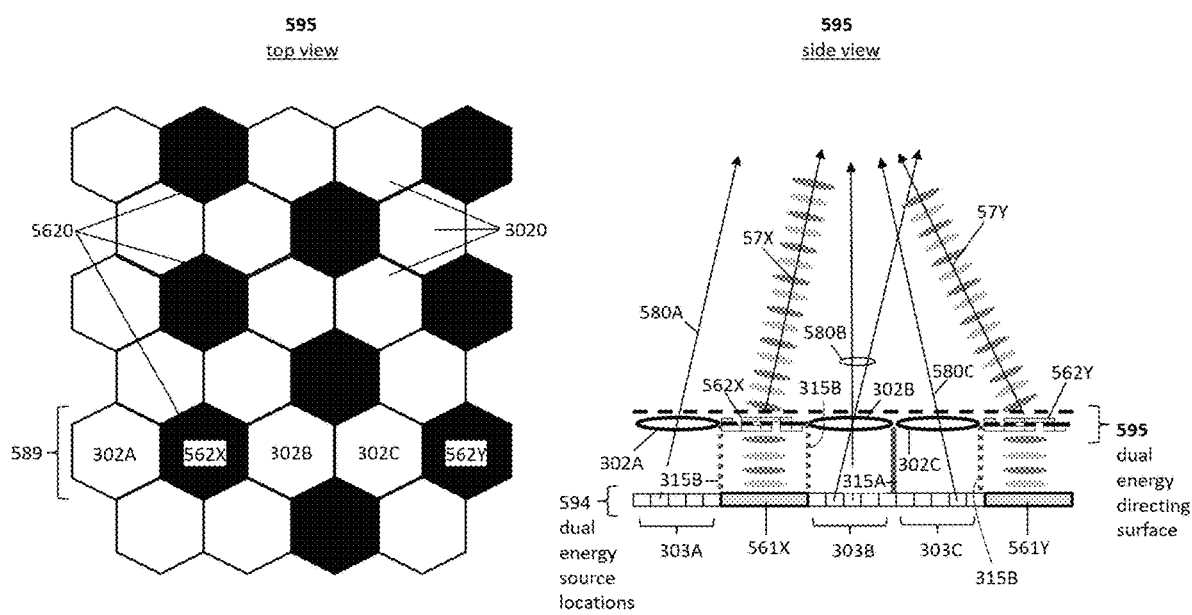
FIG. 5H shows a dual energy directing surface with interleaving energy waveguides and acoustic energy deflecting locations, in accordance with the present disclosure.

FIG. 5H illustrates how a dual energy directing surface 595 may be constructed by interleaving energy waveguides with acoustic energy deflecting locations. The top view to the left in FIG. 5H shows how energy waveguides 3020 are interleaved with acoustic energy deflecting locations 5620 on the dual energy directing surface 595. While this example shows that these elements have equal size, there are many more regular and irregular arrangements of an interleaved pattern where the acoustic deflecting locations may have a smaller or larger size than the waveguides. In this example, a row of elements 589 may be comprised of waveguides 302A, 302B, and 302C which may the waveguides 302A and 302B shown in FIG. 3A, and the row may also contain the acoustic beam deflecting locations 562X and 562Y, which may be similar to 562D and 562H shown in FIG. 5G. The side view to the right in FIG. 5H shows how waveguides 302A-C direct the electromagnetic energy from one or more electromagnetic energy source location groups 303A-C, where waveguide 302A directs energy along energy propagation path 508A, waveguide 302B directs energy along propagation paths 580B, and waveguide 302C directs energy along energy propagation path 580C. Energy-inhibiting structures 315A may be configured between neighboring waveguides 302B and 302C to inhibit the energy from one group of energy sources associated with a first waveguide from reaching the neighboring waveguide. Energy inhibiting structures 315A may be similar to 315 in FIG. 3A. Acoustic energy directing sites 562X-Y receive mechanical energy from acoustic or mechanical energy source locations 561X-Y, respectively, and deflect this energy into sound waves 57X and 57Y, respectively. Energy-inhibiting structures 315B may be configured between waveguides such as 302B and acoustic energy-deflecting sites such as 562X to confine the energy of the waveguide from interfering with the acoustic energy-deflecting site, and vice-versa. The dual energy source surface 594 contains two types of energy source locations, and this energy is directed into energy propagation paths by waveguides and acoustic energy deflection locations on the dual energy directing surface 595. While the embodiment in FIG. 5H shows one arrangement of different waveguides and acoustic beam deflection devices, there are many others which would allow an interleaved solution which projects two different 4D energy fields.

Figure 5I:
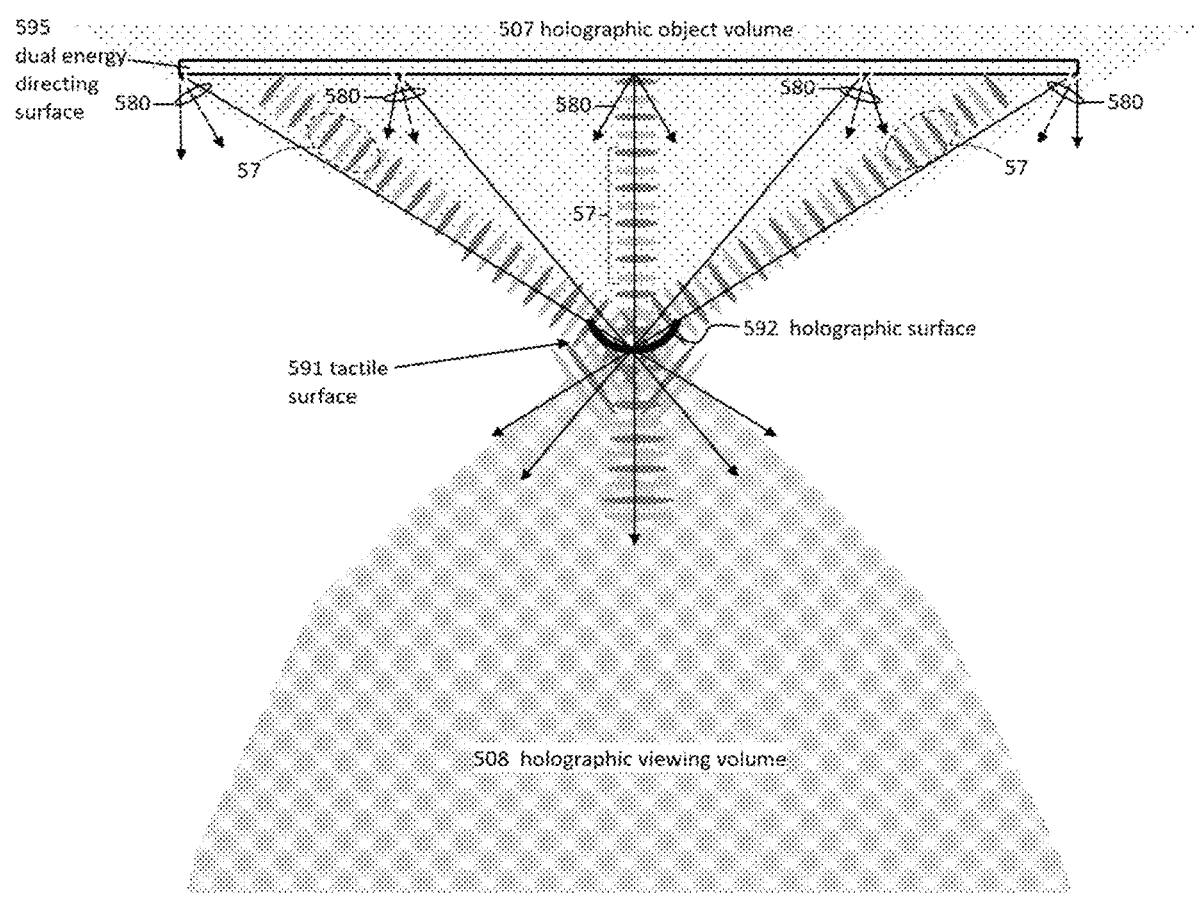
FIG. 5I shows a dual energy directing surface projecting the surface 592 of a holographic object and a tactile surface 591, in accordance with the present disclosure.

FIG. 5I shows how a dual energy directing surface 595 may be used to simultaneously project the surface 592 of a holographic object and a tactile surface 591. The energy directing surface 595 is shown in detail in FIG. 5H. The plurality of light waveguides 3020 as shown in FIG. 5H distributed across the dual energy surface 595 comprises a 4D light field, projecting light rays 580, a portion of which converge to form a holographic surface 592. Holographic objects such as 592 produced in the holographic object volume may be viewed in the holographic viewing volume. The plurality of acoustic energy deflecting locations 5620 shown in FIG. 5H distributed across the dual energy surface 595 and interleaved with the waveguides 3020 comprises a 4D acoustic energy field, and deflects a plurality of acoustic energy beams 57 so that they converge to form a tactile surface 591, which may be coincident with the holographic surface 592. The light projected light rays 580 are generated in a similar way to the light rays 580A-C shown in the side view of 595 in FIG. 5H, and the acoustic energy propagation paths 57 are generated in a similar way to the acoustic energy beams 57X-Y shown in FIG. 5H.

Figure 6:
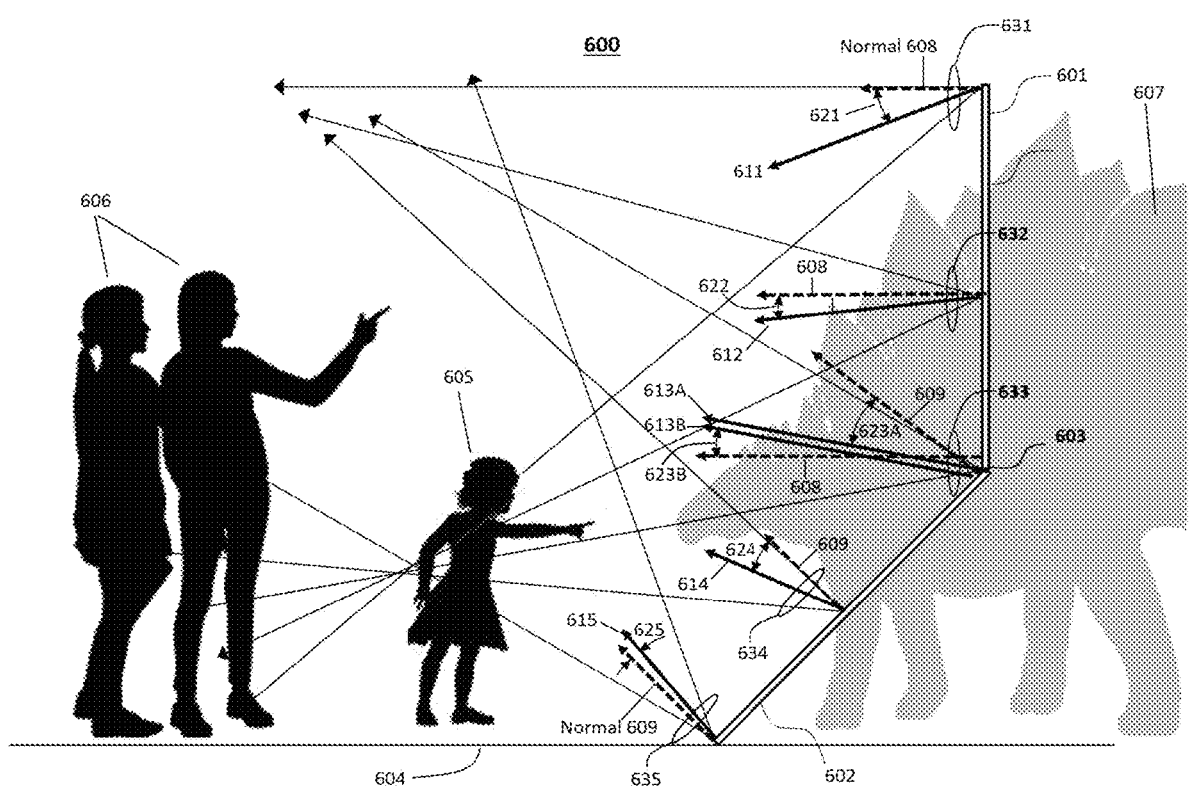
FIG. 6 illustrates an orthogonal view of an embodiment of a holographic display comprising a central wall-mounted panel directly in front of a viewing volume, and a side panel angled at 45 degrees relative to the central panel and tilted toward the viewing volume.

FIG. 6 illustrates an orthogonal view of an embodiment of a holographic display comprising a central wall-mounted light field display surface 601 directly in front of a viewing volume, and a side light field display surface 602 angled at 45 degrees relative to the central panel and tilted toward the viewing volume, where both panels feature gradient deflection angles across their surfaces. The holographic content is projected from the central panel in a direction that is generally toward the viewing volume. Light ray group 631 is projected along the energy propagation axis 611 near the top of the display, ray group 632 is projected along energy propagation axis 612 at the middle of the display, and light group 633 is projected along energy propagation axis 613A near the bottom of the display. Each of these energy projection axes is at an angle (621, 622, and 623A) from the normal 608 to the display surface 601. Similarly, the holographic content is projected from the lower light field display surface 602 also in the general direction of the viewing volume, at a variable angle relative to a normal 609 of the display surface 602. The light ray group 633 is projected along axis 613B near the top of display 602 at display surface position 603, along energy propagation axis 614 in the middle of display 602, and along energy propagation axis 615 at the bottom of the display 602. Each of these directions of propagation is also at an angle (623B, 624, 625) from the normal 609 to the display surface 602. The result is that the viewing volume may include all the audience members shown, including the little girl 605 and the two adults 606, and the head of the holographic stegosaurus 607 may be projected further out and closer to the audience member 605, increasing the realism and the immersivity of the scene.

Figure 7:
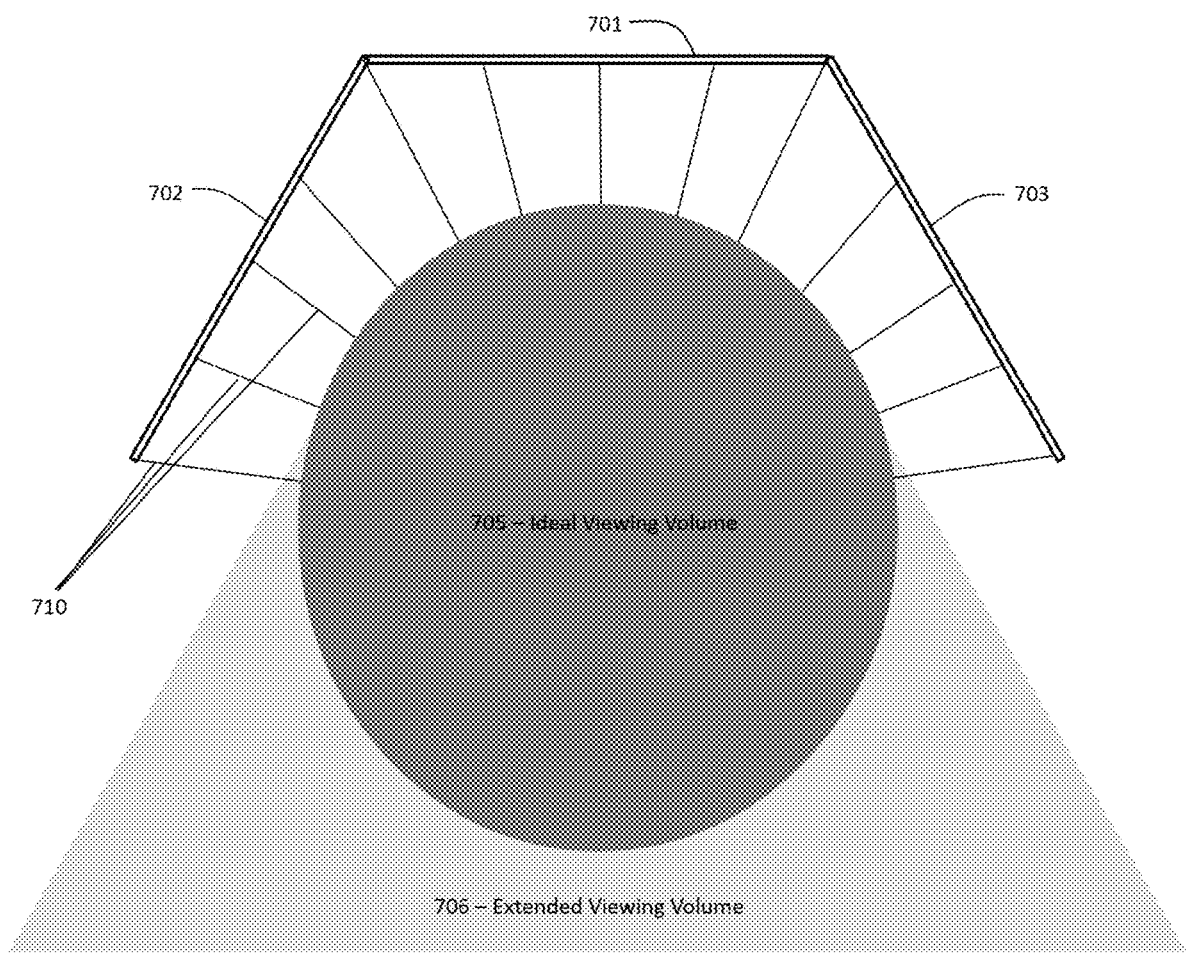
FIG. 7 illustrates a top view of an embodiment of a light field display surface comprising a central flat surface, and two light field display surfaces on either side of the central surface, angled inward toward the viewing volume with respect to the central surface.

FIG. 7 illustrates a top view of an embodiment of a light field display surface comprising a central flat surface 701, and two light field display surfaces 702, 703 on either side of the central surface 701, angled inward toward the viewing volume 705 with respect to the central surface 701. A gradient deflection angle, realized as the multiple energy projection axes 710 at an angle which is not normal to the display surface, allows holographic content to be projected from each position on each display surface along the energy projection axes 710, in a direction that is approximately toward the center of the ideal viewing volume 705. This display surface covers full field of vision for viewers located in the ideal viewing volume 705 who are facing the central display surface 701. Holographic objects can be seen for viewers that may be further away in the extended viewing volume 706. Energy directing surfaces can be used in configurations besides those shown in FIG. 7. For example, it is possible to have energy projection surfaces with multiple facets, a curved or wedged surface, or a combination of these.

An energy directing surface with only a central planar surface has a planar proximity between a holographic object and the viewing volume, a planar field of view, and a planar threshold separation between the central display surface and the viewing volume. Adding one or more side energy-directing surfaces angled towards the viewer may increase the proximity between the display surface and a holographic object relative to the planar proximity, may increase the field of view relative to the planar field of view, or may decrease the separation between the display surface and the viewing volume relative to the planar separation. Further angling the side surfaces towards the viewer may further increase the proximity, increase the field of view, or decrease the separation. In other words, the angled placement of the side surfaces may increase the immersive experience for viewers.

The embodiment of FIG. 7 may be extended to other energy domains. In FIG. 7, the holographic object volume is the volume over which light energy rays converge to form light energy surfaces, the viewing volume is the volume for receiving light energy leaving the light energy surfaces, and the field of view is the angular range of energy projection paths that are received within the energy receiving volume.

What is claimed is:

1. An energy directing system, comprising:
   an energy surface comprising a plurality of energy source locations; and
   an array of energy waveguides, each waveguide configured to direct energy along different propagation paths from different energy locations of the energy surfaces, wherein each propagation path has a four-dimensional coordinate, the four-dimensional coordinate comprising two spatial coordinates corresponding to a location of the respective energy waveguide and two angular coordinates determined at least in part by the energy source location relative to the respective waveguide, the angular coordinates defining the direction of the respective propagation path;
   wherein the propagation paths of each waveguide are grouped around an energy propagation axis that defines an axis of symmetry with respect to an angular range of the propagation paths of the respective waveguide; and
   wherein the array of energy waveguides define an energy directing surface and comprise a first waveguide having a first energy propagation axis and a second waveguide having a second energy propagation axis, the first and second energy propagation axes form first and second deflection angles, respectively, relative to a normal of the energy directing surface, and further wherein the first and second deflection angles are different; and
   an optical element disposed in the propagation paths of at least the first or the second energy waveguide of the array of energy waveguides, the optical element configured to receive energy along the propagation paths of the first or the second energy waveguide and redirect energy along a plurality of deflected propagation paths, the plurality of deflected propagation paths and the plurality of propagation paths of the first or the second energy waveguides forming non-zero deflection angles therebetween,
   wherein the optical element comprises a first surface facing towards the array of waveguides and a second surface facing away from the array of waveguides,
   wherein at least one of the first and second surfaces, or both are faceted.

2. The energy directing system of claim 1, wherein the energy propagation axis of each waveguide is substantially aligned with the average energy vector for all propagation paths of each energy waveguide.

3. The energy directing system of claim 1, wherein the wherein the energy propagation axis of each waveguide is an optical axis of the respective waveguide.

4. The energy directing system of claim 1, wherein the first deflection angle is zero and the second deflection angle is non-zero.

5. The energy directing system of claim 1, wherein the first deflection angle is non-zero and the second deflection angle is non-zero.

6. The energy directing system of claim 1, wherein the array of energy waveguides comprise additional waveguides each having an energy propagation axis that define a deflection angle relative to the normal of the energy directing surface.

7. The energy directing system of claim 6, wherein the deflection angle of each immediate subsequent waveguide in a first direction may be configured to be different than the deflection angle of each immediate preceding waveguide.

8. The energy directing system of claim 7, wherein the deflection angle of each immediate subsequent waveguide in a first direction is greater than the deflection angle of each immediate preceding waveguide in the first direction.

9. The energy directing system of claim 7, wherein the deflection angle of each immediate subsequent waveguide in a first direction is less than the deflection angle of each immediate preceding waveguide in the first direction.

10. The energy directing system of claim 1, wherein a holographic viewing volume of the array of waveguides comprises a set of locations where at least one propagation path from each waveguide of the array of waveguides can intersect.

11. The energy directing system of claim 10, wherein the deflection angles of the waveguides of the array of waveguides are configured such that the holographic viewing volume of the array of waveguides is closer to the energy directing surface than the holographic viewing volume of the array of waveguides if the deflection angles of the waveguides of array of waveguides were configured to be zero.

12. The energy directing system of claim 1, wherein the deflection angles of the waveguides of the array of waveguides are configured such that the energy propagation axes are oriented toward a center portion of the energy directing surface.

13. The energy directing system of claim 1, wherein one of the first and second waveguides is configured to propagate energy through a first group of energy source locations on the energy surface, the group of energy source locations has a center energy location that is offset from a symmetrical center of the respective waveguide.

14. The energy directing system of claim 13, wherein the other one of the first and second waveguides is configured to propagate energy through a second group of energy locations on the energy surface, the group of energy locations has a center energy location that is aligned with a symmetrical axis of the second waveguide.

15. The energy directing system of claim 1, wherein the second waveguide is tilted at an angle relative to a normal of the energy surface.

16. The energy directing system of claim 1, wherein the second waveguide has an asymmetrical surface.

17. An energy directing system, comprising:
    an energy surface comprising a plurality of energy source locations;
    an array of energy waveguides, each waveguide configured to direct energy along different propagation paths from different energy locations of the energy surfaces, wherein each propagation path has a four-dimensional coordinate, the four-dimensional coordinate comprising two spatial coordinates corresponding to a location of the respective energy waveguide and two angular coordinates determined at least in part by the energy source location relative to the respective waveguide, the angular coordinates defining the direction of the respective propagation path; and
    an optical element disposed in the propagation paths of at least a first energy waveguide of the array of energy waveguides, the optical element configured to receive energy along the propagation paths of the first energy waveguide and redirect energy along a plurality of deflected propagation paths, the plurality of deflected propagation paths and the plurality of propagation paths of the first energy waveguides forming non-zero deflection angles therebetween, wherein the optical element comprises a first surface facing towards the array of waveguides and a second surface facing away from the array of waveguides, wherein at least one of the first and second surfaces, or both are faceted.

18. The energy directing system of claim 17, wherein a central propagation path maps to a deflected propagation path substantially aligned with along an axis of symmetry for the plurality of deflected propagation paths.

19. The energy directing system of claim 17, wherein the non-zero deflection angle of the plurality of deflected propagation paths form a gradient of deflection angles.

20. The energy directing system of claim 17, wherein the optical element comprises a refractive element.

21. The energy directing system of claim 17, wherein the optical element comprises a plurality of side-by-side prisms.

22. The energy directing system of claim 17, wherein energy is deflected at each of first and second surfaces as energy passes therethrough.

23. The energy directing system of claim 17, wherein the optical element comprises one or more layers of metamaterials configured to deflect energy received along the plurality of propagation paths of the first energy waveguide.

24. The energy directing system of claim 17, wherein the energy surface comprises energy pixels and defines a pixel plane, and the plurality of energy locations correspond to locations of energy pixels in the pixel plane.

25. The energy directing system of claim 17, wherein the energy surface comprises a relayed energy surface, and the plurality of energy locations correspond to locations on the relayed energy surface.

26. The energy directing system of claim 17, wherein a holographic viewing volume comprises a set of locations where the plurality of deflected propagation paths of the first energy waveguide intersect with propagation paths of at least one additional energy waveguide.

27. An energy directing system, comprising:

an energy surface comprising a plurality of energy source locations;

an array of energy waveguides, each waveguide configured to direct energy along different propagation paths from different energy locations of the energy surfaces, wherein each propagation path has a four-dimensional coordinate, the four-dimensional coordinate comprising two spatial coordinates corresponding to a location of the respective energy waveguide and two angular coordinates determined at least in part by the energy source location relative to the respective waveguide, the angular coordinates defining the direction of the respective propagation path; and an optical element disposed in the propagation paths of at least a first energy waveguide of the array of energy waveguides, the optical element configured to receive energy along the propagation paths of the first energy waveguide and redirect energy along a plurality of deflected propagation paths, the plurality of deflected propagation paths and the plurality of propagation paths of the first energy waveguides forming non-zero deflection angles therebetween, wherein the optical element comprises one or more layers of metamaterials configured to deflect energy received along the plurality of propagation paths of the first energy waveguide.

* * * * *